(12) United States Patent
Utkovski et al.

(10) Patent No.: US 12,192,974 B2
(45) Date of Patent: *Jan. 7, 2025

(54) RESOURCE-STAGGERED CODED MULTIPLE ACCESS

(71) Applicant: Fraunhofer-Gesellschaft zur Foerderung der angewandten Forschung e.V., Munich (DE)

(72) Inventors: Zoran Utkovski, Berlin (DE); Johannes Dommel, Berlin (DE); Thomas Haustein, Berlin (DE); Lars Thiele, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,905

(22) Filed: Jan. 22, 2024

(65) Prior Publication Data
US 2024/0244598 A1 Jul. 18, 2024

Related U.S. Application Data

(63) Continuation of application No. 17/245,855, filed on Apr. 30, 2021, now Pat. No. 11,917,592, which is a (Continued)

(30) Foreign Application Priority Data

Nov. 2, 2018 (EP) .................................. 18 204 207

(51) Int. Cl.
*H04W 72/0446* (2023.01)
*H04L 5/00* (2006.01)
*H04W 74/08* (2024.01)

(52) U.S. Cl.
CPC ....... *H04W 72/0446* (2013.01); *H04L 5/0053* (2013.01)

(58) Field of Classification Search
CPC .............. H04W 72/0446; H04W 74/08; H04L 5/0053; H04L 5/0026
See application file for complete search history.

(56) References Cited

U.S. PATENT DOCUMENTS 7,978,610 B1 7/2011 Mcintire et al.
10,530,547 B2 * 1/2020 Li ......................... H04L 5/0051
(Continued)

FOREIGN PATENT DOCUMENTS

CN 102388319 A 3/2012
CN 103731378 A 4/2014
WO 2017197075 A1 11/2017

OTHER PUBLICATIONS

3GPP: R1-1811274, "Enhanced SPS and grant-free transmissions".
(Continued)

*Primary Examiner* — Harry H Kim
(74) *Attorney, Agent, or Firm* — Perkins Coie LLP; Michael A. Glenn

(57) ABSTRACT

A wireless communications network includes a base station configured for operating a wireless communications network cell of the wireless communications network so as to provide communication in a plurality of slots. Each slot includes a plurality of associated physical resources. The wireless communications network includes at least one transmitter configured for transmitting a signal in the wireless communications network cell by mapping the signal into a number of part signals and for transmitting the number of part signals with a corresponding number of associated slots using a corresponding number of sets of physical resources, each set containing at least a subset of the associated plurality of physical resources of the slot. Each
(Continued)

set of physical resources is received at the base station shifted with a set-individual offset and with respect to a synchronized start of the slot.

16 Claims, 13 Drawing Sheets

Related U.S. Application Data continuation of application No. PCT/EP2019/079848, filed on Oct. 31, 2019.

(56) References Cited

U.S. PATENT DOCUMENTS

| 10,965,419 | B2* | 3/2021 | Li | H04L 5/0055 |
|---|---|---|---|---|
| 2010/0260154 | A1* | 10/2010 | Frank | G01S 5/0205 |
| | | | | 370/336 |
| 2013/0010682 | A1* | 1/2013 | Kim | H04L 1/0046 |
| | | | | 370/315 |
| 2015/0110066 | A1* | 4/2015 | Gaal | H04L 27/0006 |
| | | | | 370/330 |
| 2018/0248667 | A1* | 8/2018 | Beale | H04L 5/0091 |
| 2018/0270893 | A1* | 9/2018 | Patel | H04W 72/30 |
| 2019/0380098 | A1* | 12/2019 | Liu | H04W 56/00 |
| 2021/0194626 | A1* | 6/2021 | Chatterjee | H04L 5/0044 |
| 2021/0385809 | A1* | 12/2021 | Kang | H04W 72/0453 |

OTHER PUBLICATIONS

Clazzer, Federico, et al., "Enhanced Contention Resolution Aloha—ECRA", arXiv preprint arXiv:1211.5027 (2012).

Fraunhofer, Hhi, et al., "Discussion on staggered NOMA", 3GPP Draft; R1-1813148, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, Nov. 2, 2018 (Nov. 2, 2018), XP051479414, Retrieved from the Internet: URL:http://www.3gpp.org/ftp/tsg%5Fran/WG1%5FRL1/TSGR1%5F95/Docs/R1%2D1813148%2Ezip [retrieved on Nov. 2, 2018].

Hughes, "NR-NOMA: Partially Asynchronous and Multi-Layer Transmission of ACMA", 3GPP Draft; RI-1808205, 3rd Generation Partnership Project (3GPP), Mobile Competence Centre; 650, Route Des Lucioles; F-06921 Sophia-Antipolis Cedex; France, vol. RAN WGI, No. Gothenburg, Sweden; Aug. 20, 2018-Aug. 24, 2018, Aug. 10, 2018 (Aug. 10, 2018), XP051515590, Retrieved from the Internet: URL:http://www.3gpp.org/ftp/tsg%5Fran/WG1%5FRL1/TSGR1%5F94/Docs/R1%2D1808205%2Ezip [retrieved on Aug. 10, 2018].

Hughes, "Transmitter side signal processing of ACMA", 3GPP Draft; R1-1810623, 3rd Generation Partnership Project (3GPP), Mobile Competence Centre, 650 Route Des Lucioles, F-06921 Sophia-Antipolis Cedex, France, vol. RAN WG1, No. Chengdu,China; Oct. 8, 2018-Oct. 12, 2018, Sep. 28, 2018 (Sep. 28, 2018), XP051518029, Retrieved from the Internet: URL:http://www.3gpp.org/ftp/tsg%5Fran/WG1%5FRL1/TSGR1%5F94b/Docs/R1%2D1810623%2Ezip [retrieved on Sep. 28, 2018], 2018.

Yan, Chen, et al., "Toward the Standardization of Non-Orthogonal Multiple Access for Next Generation Wireless Networks—1 of 3", IEEE Communications Magazine., vol. 56, No. 3, Mar. 1, 2018 (Mar. 1, 2018), pp. 19-27, XP055480187, US ISSN: 0163-6804, DOI: 10.1109/MCOM.2018.1700845, p. 19-p. 24; figures 1-5.

Yan, Chen, et al., "Toward the Standardization of Non-Orthogonal Multiple Access for Next Generation Wireless Networks—2 of 3", IEEE Communications Magazine., vol. 56, No. 3, Mar. 1, 2018 (Mar. 1, 2018), pp. 19-27, XP055480187, US ISSN: 0163-6804, DOI: 10.1109/MCOM.2018.1700845, p. 19-p. 24; figures 1-5.

Yan, Chen, et al., "Toward the Standardization of Non-Orthogonal Multiple Access for Next Generation Wireless Networks—3 of 3", IEEE Communications Magazine., vol. 56, No. 3, Mar. 1, 2018 (Mar. 1, 2018), pp. 19-27, XP055480187, US ISSN: 0163-6804, DOI: 10.1109/MCOM.2018.1700845, p. 19-p. 24; figures 1-5.

\* cited by examiner

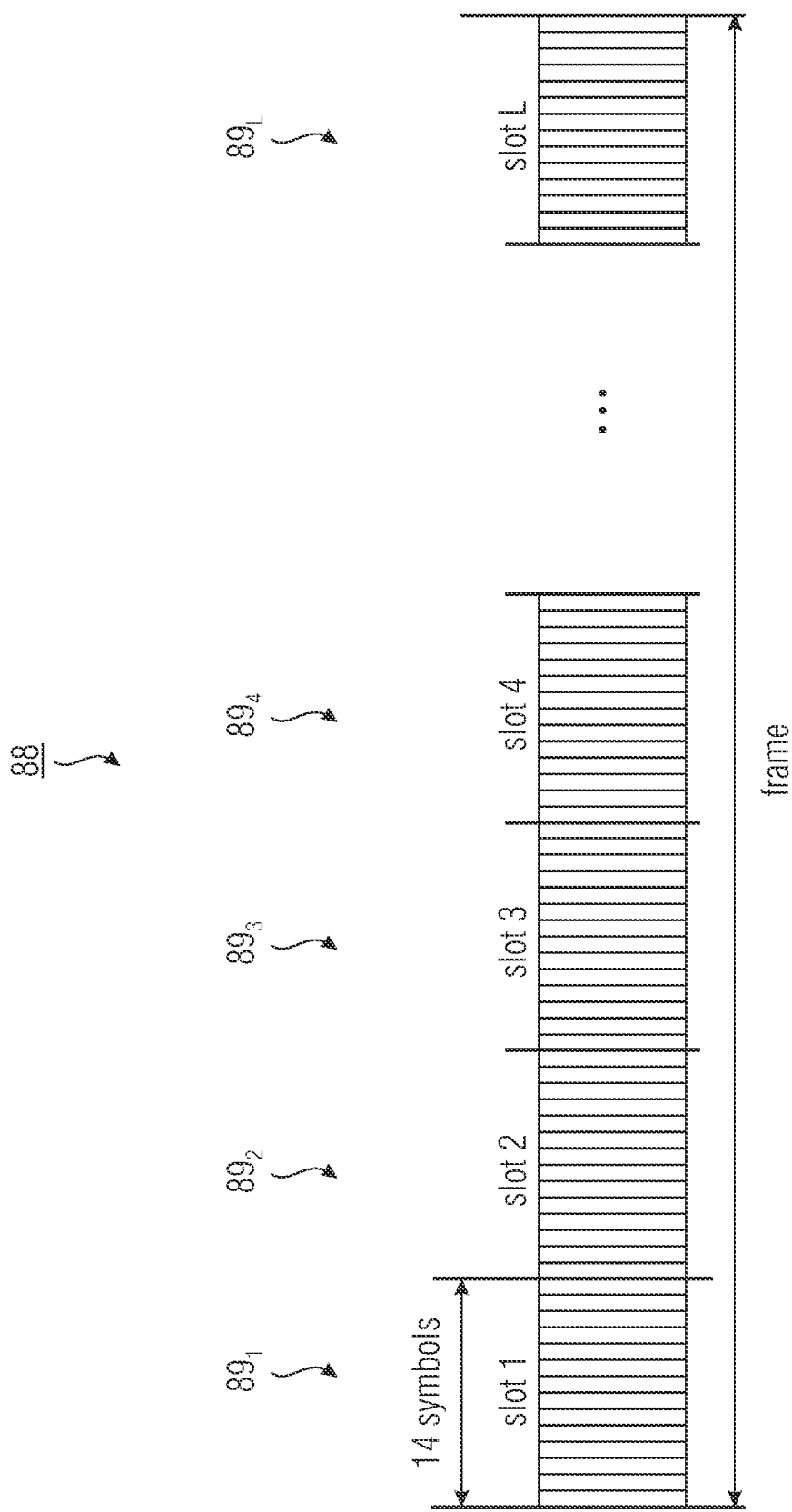

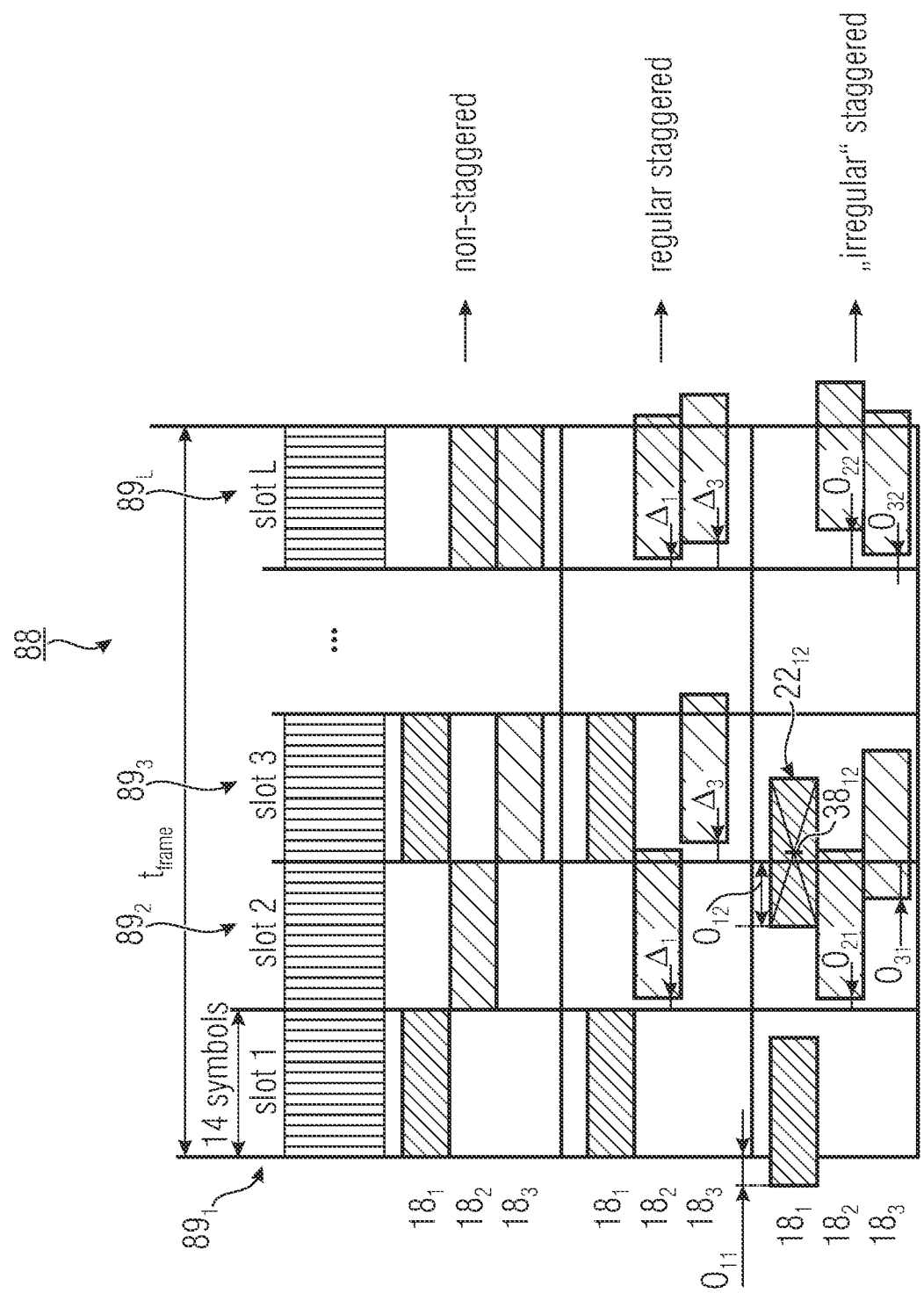

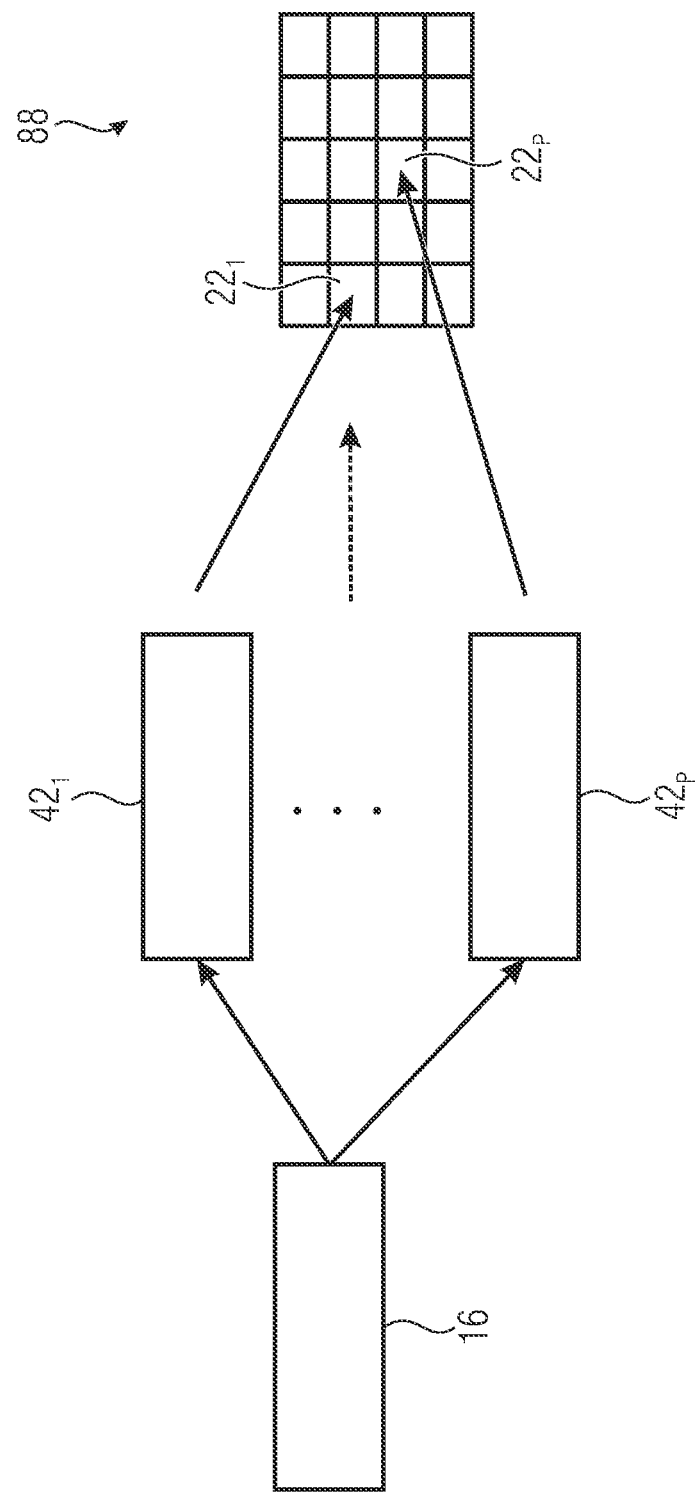

RESOURCE-STAGGERED CODED MULTIPLE ACCESS

CROSS-REFERENCES TO RELATED APPLICATIONS

This application is a continuation of copending U.S. patent application Ser. No. 17/245,855 filed Apr. 30, 2021, which is a continuation of International Application No. PCT/EP2019/079848, filed Oct. 31, 2019, which is incorporated herein by reference in its entirety, and additionally claims priority from European Application No. EP 18 204 207.7, filed Nov. 2, 2018, which is incorporated herein by reference in its entirety.

The present invention concerns the field of wireless communication networks or systems, more specifically, concepts to improve transmission by providing offsets with regard to synchronized communication. The present invention relates to wireless communications networks, to a transmitter and to a base station and to methods for operating the same. The present invention, in particular, extends elements of staggered coded multiple access (or staggered asynchronous coded multiple access (SACMA)).

BACKGROUND OF THE INVENTION

A slotted ALOHA scenario with Successive Interference Cancellation (SIC) capabilities at the receiver may improve dramatically the performance of the random-access procedure due to the ability to remove successfully decoded packets from the received signal within a specific time frame. However, current results from theory show that by introducing a random time-shift (offset) individually to each users' transmission increases the time-diversity and allows further to resolve collisions.

In connection with 3GPP, this idea is proposed to be adopted as the Asynchronous Coded Multiple Access (ACMA) as described in [1], which uses random time-offset for the start of the individual transmissions with respect to the beginning of the frame, or an aggregated resource. The shifted timing improves overloading capability by randomly distributing multi-user interference, wherein the start time of each transmission is randomly distributed within the frame, i.e. the aggregated resource, as illustrated in FIG. 9.

Known concepts face the problems that the receiver needs to estimate offset parameters for each user. The same delay value for two (or more) users leads to collision and thus to an increase in the probability of errors.

Thus, there is a demand for providing for wireless communications networks, a transmitter and a base station and for method for operating the same that allow for a low probability of errors.

SUMMARY

According to an embodiment, a wireless communications network may have: a base station configured for operating a wireless communications network cell of the wireless communications network so as to provide communication in a plurality of slots, each slot containing a plurality of associated physical resources; at least one transmitter configured for transmitting a signal in the wireless communications network cell by mapping the signal into a number of part signals and for transmitting the number of part signals with a corresponding number of associated slots using a corresponding number of sets of physical resources, each set including at least a subset of the associated plurality of physical resources of the slot; wherein each set of physical resources is received at the base station shifted with a set-individual offset with respect to a synchronized start of the slot.

According to another embodiment, a wireless communications network may have: a base station configured for operating a wireless communications network cell of the wireless communications network so as to provide communication in a plurality of slots, each slot containing a plurality of associated physical resources; at least one transmitter configured for transmitting a signal in the wireless communications network cell by mapping the signal into a number of part signals and for transmitting the number of part signals associated to a corresponding number of slots using a corresponding number of sets of physical resources, each set including at least a subset of the associated plurality of physical resources of the slot; wherein each set of physical resources is received at the base station shifted with a frequency offset with respect to a synchronized minimum frequency of the slot.

According to another embodiment, a transmitter may have: an interface configured for transmitting a signal in a wireless communications network cell of a wireless communications network; a control unit configured for mapping the signal into a number of part signals and for transmitting the number of part signals with a corresponding number of associated slots of the wireless communications network cell using a corresponding number of sets of physical resources, each set including at least a subset of the associated plurality of physical resources of the slot; wherein the control unit is configured for transmitting the number of part signals with a set-individual offset such that each set of physical resources is shifted with respect to a synchronized start of the slot.

According to another embodiment, a method for operating a wireless communications network may have the steps of: operating a wireless communications network cell of the wireless communications network so as to provide communication in a plurality of slots such that each slot containing a plurality of associated physical resources; transmitting a signal in the wireless communications network cell by mapping the signal into a number of part signals; transmitting the number of part signals with a corresponding number of associated slots using a corresponding number of sets of physical resources, each set including at least a subset of the associated plurality of physical resources of the slot; such that each set of physical resources is received at a base station shifted with a set-individual offset with respect to a synchronized start of the slot.

The inventors have found that by individually signing an offset to a transmission within a slot of a frame of the wireless communications network, there is obtained a plurality of different offset values such that an event of collision has only minor impact because it may easily be decoded or resolved such that an overall error rate is low. Even if facing a collision within one slot, the amount or portion of the transmission that is collided may below based on different offsets within different transmitters. Even if having a high collision portion, there is at least a probability that the next slot used within a frame faces no collision or a collision with a different transmitter such that in total a high probability for resolving already decoding the collision may be obtained. Alternatively or in addition, the offset may at least partially be implemented in the frequency-domain, i.e., a frequency-offset may be implemented. This may allow for a low collision probability, in particular, when comparing the results to offset-less concepts or to concepts that provide for a time-offset only. Equivalently, embodiments may allow for the system to accommodate more users under the same error probability as before. That is, with the proposed staggering one may decrease the overall error probability by keeping the number of users fixed (due to the partial instead of fully-overlapping collisions taking place) and/or may invest at least a part of this advantage to increase the number of users sharing the available resources, e.g., under a target error rate. Embodiments allow to incorporate the concept of asynchronous random access in the framework of systems which assume an underlying time-frequency plan, such as e.g. OFDM.

According to an embodiment, a wireless communications network comprises a base station configured for operating a wireless communications network cell of the wireless communications network so as to provide communication in a plurality of slots, each slot comprising a plurality of associated physical resources. The wireless communications network comprises at least one transmitter configured for transmitting a signal in the wireless communications network cell by mapping the signal into a number of part signals and for transmitting the number of part signals with a corresponding number of associated slots using a corresponding number of sets of physical resources, each set containing at least a subset of the associated plurality of physical resources of the slot. Each part signal may be at least a fraction of a signal to be transmitted or a retransmission of such a fraction. Each set of physical resources is received at the base station shifted with a set-individual offset with respect to a synchronized start of the slot. This allows to have a different offset for each part signal such that a single collided set of physical resources is accompanied by a high probability that further slots within the frame are less collided, uncollided, or at least collided by different transmitters.

According to an embodiment, a wireless communications network comprises a base station configured for operating a wireless communications network cell of the wireless communications network so as to provide communication in a plurality of slots, each slot comprising a plurality of associated physical resources. The wireless communications network comprises at least one transmitter configured for transmitting a signal in the wireless communications networks by mapping the signal into a number of part signals and for transmitting the number of part signals associated to a corresponding number of slots using a corresponding number of sets of physical resources, each set containing at least a subset of the associated plurality of physical resources of the slot. Each set of physical resources is received at the base station shifted with a frequency offset with respect to a synchronized minimum frequency of the slot.

According to an embodiment, a transmitter comprises an interface configured for transmitting a signal in a wireless communications network cell of a wireless communications network. The transmitter comprises a control unit configured for mapping the signal into a number of part signals and for transmitting the number of part signals with a corresponding number of associated slots of the wireless communications network cell using a corresponding number of sets of physical resources, each set containing at least a subset of the associated plurality of physical resources of the slot.

The control unit is configured for transmitting the number of part signals with a set-individual offset such that each set of physical resources is shifted with respect to a synchronized start of the slot.

According to an embodiment, a base station configured for operating a wireless communications network cell according to a wireless communications network scheme comprises a plurality of frames. Each frame comprises a plurality of slots, wherein each slot comprises a plurality of associated physical resources. The base station comprises an interface configured for receiving a first number of part signals from a first transmitter and for receiving a second number of part signals from a second transmitter. Each part signal is associated to a slot of a dedicated frame. Each part signal of the first number of part signal comprises a set-individual offset within the first number and with respect to a synchronized start of the slot. Each part signal of the second number of part signal comprises a set-individual offset within the second number and with respect to the synchronized start of the slot. The base station comprises a decoding unit configured for decoding the received first part signals and the received second part signals and for correcting interference caused by an overlap of the first part signals with the second part signals.

According to an embodiment, a method for operating a wireless communications network comprises operating a wireless communications network cell of the wireless communications network so as to provide communication in a plurality of slots such that each slot comprises a plurality of associated physical resources. The method comprises transmitting a signal in the wireless communications network cell by mapping the signal into a number of part signals. The method comprises transmitting the number of part signals with a corresponding number of associated slots using a corresponding number of sets of physical resources, each set containing at least a subset of the associated plurality of physical resources of the slot. The method is performed such that each set of physical resources is received at a base station shifted with a set-individual offset with respect to a synchronized start of the slot.

According to an embodiment, a method for operating a wireless communications network comprises operating a wireless communications network cell of the wireless communications network so as to provide communication in a plurality of slots such that each slot comprises a plurality of associated physical resources. The method comprises transmitting a signal in the wireless communications network cell by mapping the signal into a number of part signals and by transmitting the number of part signals with a corresponding number of associated slots using a corresponding number of sets of physical resources. Each set contains at least a subset of the associated plurality of physical resources of the slot. The method is performed such that each set of physical resource is received at a base station shifted with a frequency offset with respect to a synchronized minimum frequency of the slot.

According to an embodiment, a method for operating a transmitter comprises transmitting a signal in a wireless communications network cell of a wireless communications network using an interface by mapping the signal into a number of part signals. Transmission is further transformed by transmitting the number of part signals with a corresponding number of associated slots of the wireless communications network cell using a corresponding number of sets of physical resources. Each set contains at least a subset of the associated plurality of physical resources of the slot. The method comprises transmitting the number of part signals with a set-individual offset such that each set of physical resources is shifted with respect to a synchronized start of the slot.

According to an embodiment, a method for operating a base station configured for operating a wireless communications network cell according to a wireless communications network scheme comprising a plurality of frames, each frame comprising a plurality of slots, each slot comprising a plurality of associated physical resources, comprises receiving a first number of part signals from a first transmitter and receiving a second number of part signals from a second transmitter. Each part signal is associated to a slot of a dedicated frame, wherein each part signal of the first number of part signals comprises a set-individual offset within the first number and with respect to a synchronized start of the first slot. Each part signal of the second number of part signals comprises a set-individual offset within the second number and with respect to the synchronized start of the slot. The method comprises decoding the received first part signals and the received second part signals and for correcting interference caused by an overlap of the first part signals with the second part signals.

BRIEF DESCRIPTION OF THE DRAWINGS

Embodiments of the present invention will be detailed subsequently referring to the appended drawings, in which:

FIG. 2b shows a schematic view of an alternative structure of a frame in accordance with an embodiment;

FIG. 6d shows a comparison between different offset schedules for illustrating an embodiment;

FIG. 8a shows a schematic block diagram illustrating the concept of mapping a signal to be transmitted by a transmitter into a number of part signals according to an embodiment;

DETAILED DESCRIPTION OF THE INVENTION

In the following, embodiments of the present invention are described in further detail with reference to the enclosed drawings in which elements having the same or a similar function are referenced by the same or similar reference signs.

Also, in the following, reference is made to OFDM (orthogonal frequency division multiple access) networks and/or LTE (long term evolution) networks, embodiments described herein are not limited hereto.

Although, the embodiments described herein may relate to Log Term Evolution (LTE) any other communication scheme, in particular in connection with slotted communication using slots may be used. A slot may be regarded as an interval, e.g., in time and/or frequency that is possibly sub-structured, e.g., into symbols or the like, and provides for some kind of synchronization for communication, wherein synchronization is not limited to time.

Figure 1:
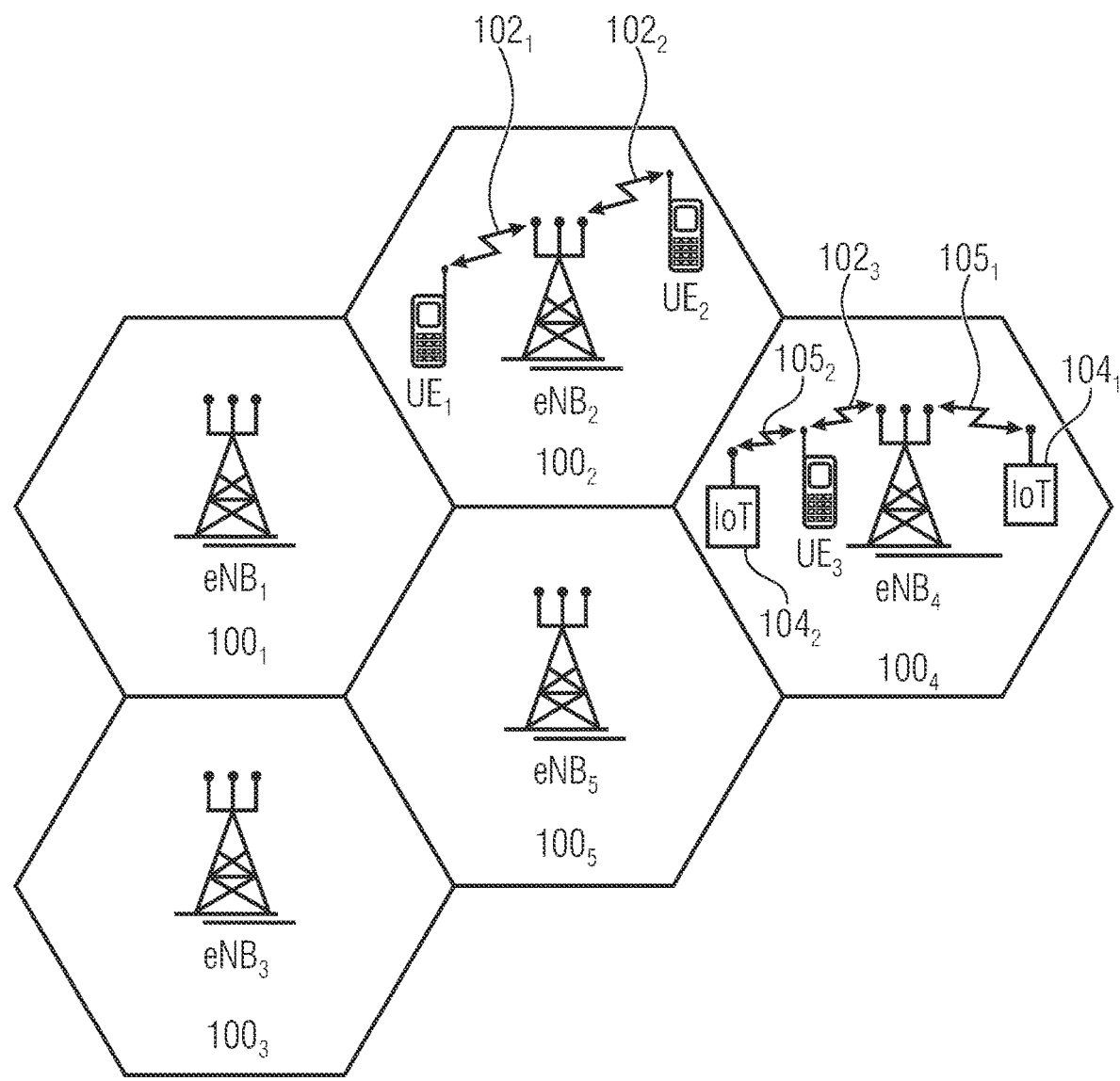
FIG. 1 is a schematic representation of an example of a network infrastructure in accordance with an embodiment, like a wireless communications system including a plurality of base stations, each serving a specific area surrounding the base station schematically represented by the respective cells.

FIG. 1 is a schematic representation of an example of such a network infrastructure, like a wireless communications system including a plurality of base stations $eNB_1$ to $eNB_5$, each serving a specific area surrounding the base station schematically represented by the respective cells 1001 to 1005. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more or less of such cells. FIG. 1 shows two users $UE_1$ and $UE_2$, also referred to as user equipment (UE), that are in cell 100$_2$ and that are served by base station $eNB_2$. Another user $UE_3$ is shown in cell 100$_4$ which is served by base station $eNB_4$. The arrows 100$_2$, 102$_2$ and 102$_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices 104$_1$ and 104$_2$ in cell 100$_4$, which may be stationary or mobile devices. The IoT device 104$_1$ accesses the wireless communication system via the base station $eNB_4$ to receive and transmit data as schematically represented by arrow 105$_1$. The IoT device 104$_2$ accesses the wireless communication system via the user UEs as is schematically represented by arrow 105$_2$. $UE_1$, $UE_2$ and UEs may access the wireless communications system or network by communicating with the base station.

The wireless communications network system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IOT enhancement of the LTE Rel. 13 standard includes 1 PRB. In accordance with LTE and NB-IOT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

Figure 2A:
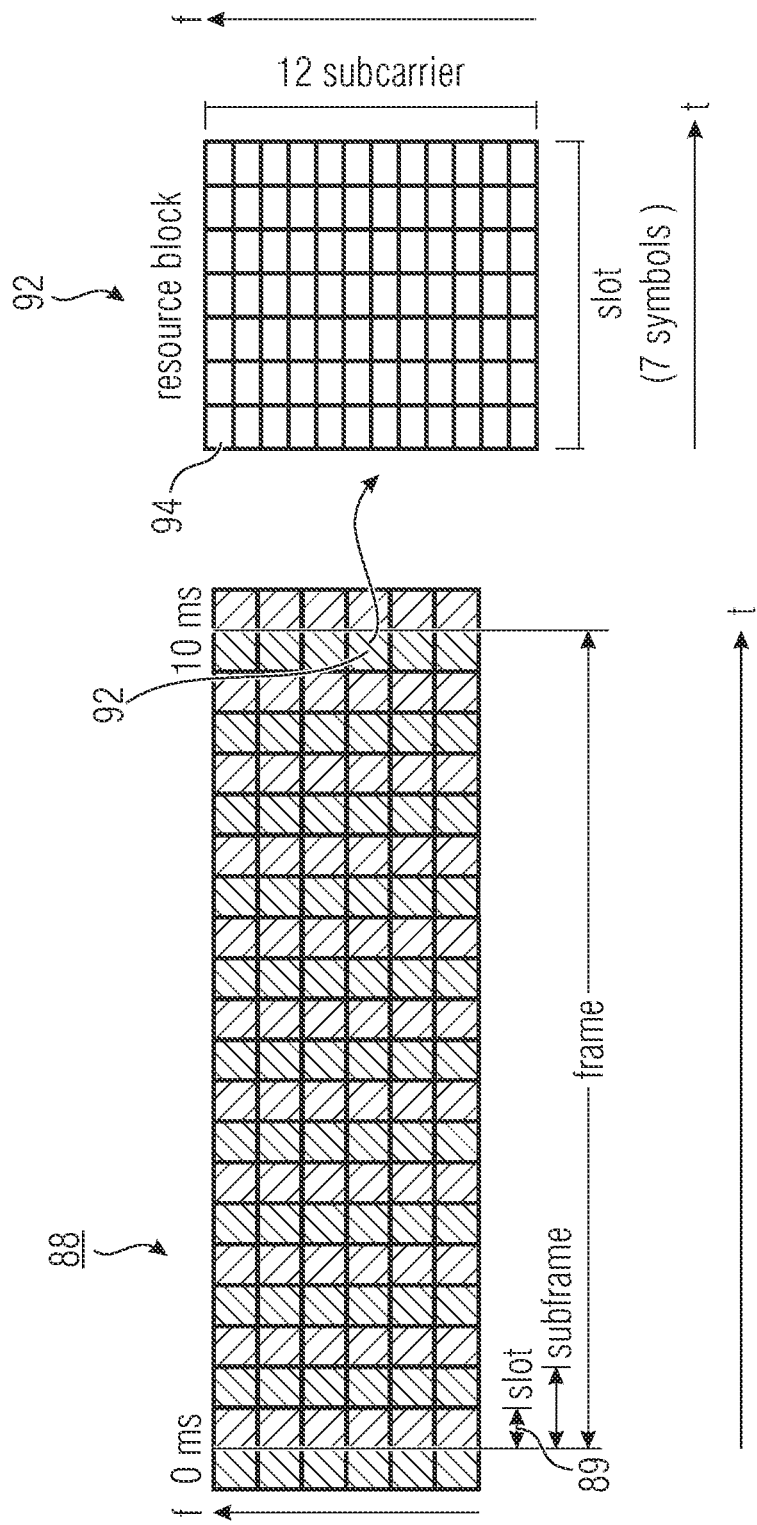
FIG. 2a shows an exemplary scheme of an LTE frame as described in connection with FIG. 1.

FIG. 2a shows an exemplary scheme of an LTE frame 88 as described in connection with FIG. 1, the frame 88 may have ten subframes of 10 ms length, wherein each subframe may include two slots 89 of six or seven OFDM symbols each, depending on the cyclic prefix (CP) length. For example, in LTE, each slot 89 may comprise a number of resource blocks 92, wherein each resource block 92 may be divided into a number of, for example, 12 subcarriers in frequency and into six or seven symbols in time. Resource elements 94 of resource block 92 may have a length of one symbol and may occupy one subcarrier.

To transmit information, one, a plurality or all resources elements 94 of a resource block 92 may be utilized. Alternatively or in addition, more than one resource block 92 (all available resource elements therein or only a part thereof) may be used.

FIG. 2b shows a schematic view of an alternative structure of frame 88. Frame 88 may have a number of L slots 89, wherein L may be any suitable number larger than 0, e.g., 1 or more, 2 or more, 5 or more, 10 or more or 15 or more such as 18. In accordance with FIG. 2a, each slot 89 may comprise a number of symbols, wherein the number of symbols may be different to 6 or 7, e.g., 14 or any other number.

Figure 3:
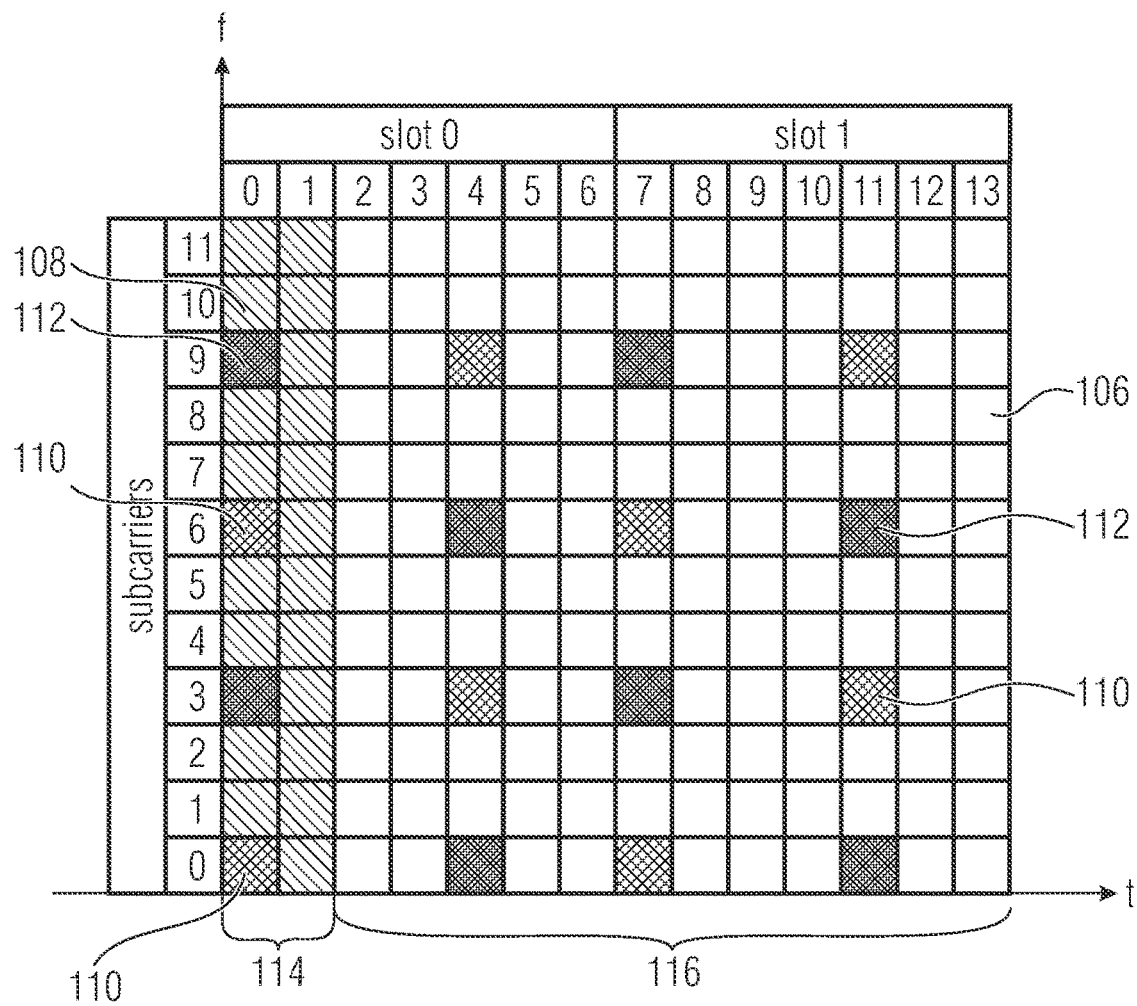
FIG. 3 shows an exemplary LTE OFDMA-based subframe with two antenna ports for different selected $T_X$ antenna ports.

FIG. 3 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13 so as to have 14 OFDM symbols in a subframe. The white boxes 106 represent resource elements allocated to the PDSCH including the payload or user data, also referred to a payload region. The resource elements for the physical control channels (including non-payload or non-user data), also referred to the control region, are represented by the hatched boxes 103. In accordance with examples, resource elements 103 may be allocated to the PDCCH, to the physical control format indicator channel (PCFICH), and to the physical hybrid ARQ indicator channel (PHICH). The cross-hatched boxes 107 represent resource elements which are allocated to the RS that may be used for the channel estimation. The black boxes 108 represent unused resources in the current antenna port that may correspond to RSs in another antenna port. The resource elements 103, 107, 108 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 3 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

Reference to LTE, especially in view of a frame structure, is made by way of non-limited example only. Frames may comprise a different structure, especially in view of a number of subframes, slots and/or resource blocks.

Figure 4:
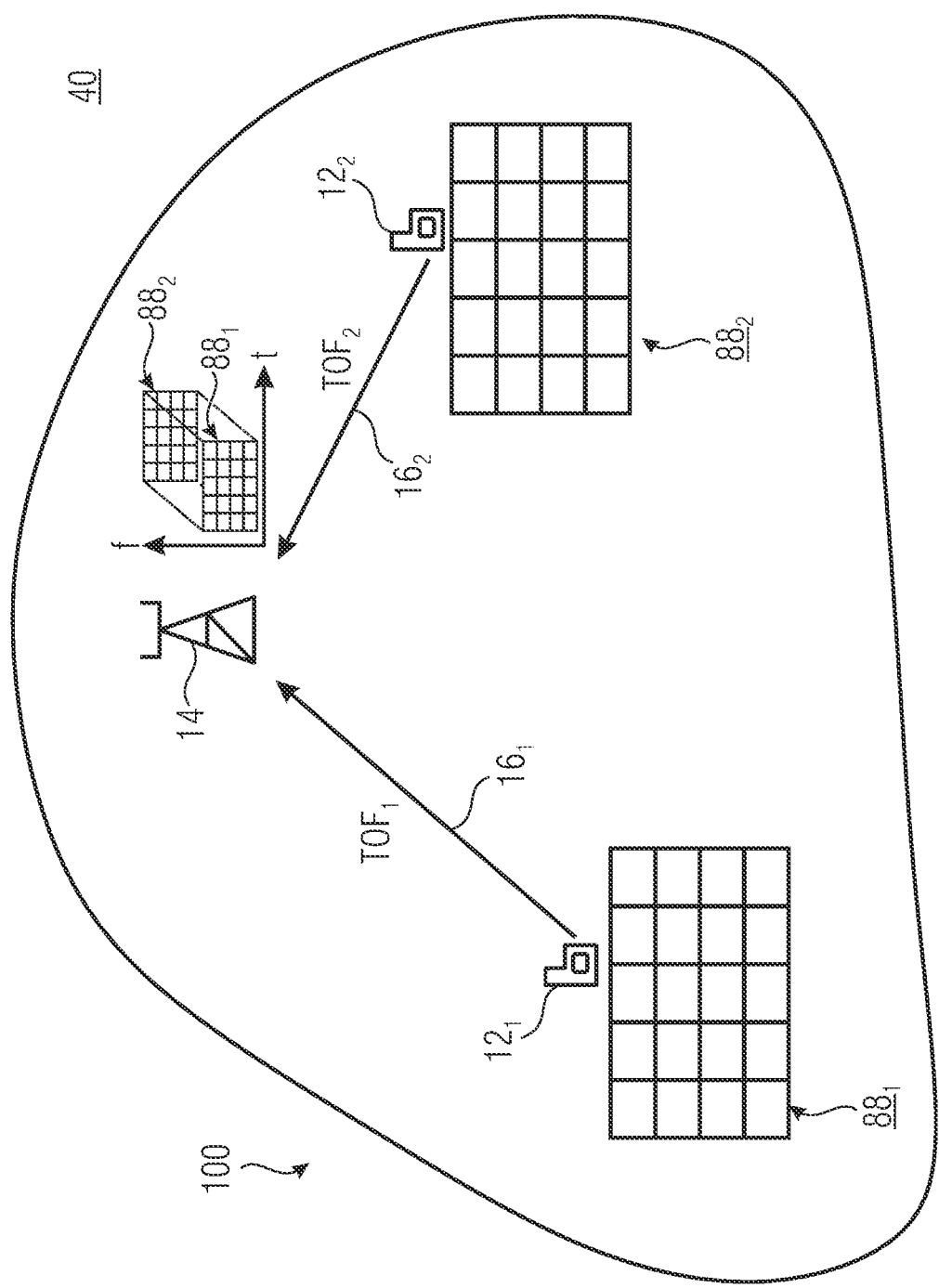
FIG. 4 shows a schematic block diagram of a wireless communications network according to an embodiment.

FIG. 4 shows a schematic block diagram of a wireless communications network 40 according to an embodiment. The wireless communications network 40 comprises one, two, three or even a higher number of transmitters $12_1$, $12_2$ respectively. The transmitters 12 may comprise, for example, a functionality of IoT devices 104 and/or of a UE.

The wireless communications network 40 comprises a base station 14 configured for operating a wireless communications network cell 100 of the wireless communications network 40 so as to provide communication in the cell 100. The communication may relate to a direct communication between the transmitters $12_1$ and $12_2$ and/or to a communication between the transmitter $12_1$ and the base station 14 and/or between the transmitter $12_2$ and the base station 14. For example, the base station 14 may set up a communication scheme as described in connection with FIGS. 1 to 3 as a basis for the embodiments described herein. I.e., the communication may be performed such that a communication frame is divided into a plurality of slots. Each slot comprises a plurality of associated physical resources as described in connection with FIG. 2.

The transmitters $12_1$ and $12_2$ may be configured for transmitting a signal $16_1$, $16_2$, respectively. The respective frame $88_1$, $88_2$ utilized, filled or referenced at the respective transmitter $12_1$, $12_2$ respectively may be a same frame structure at the base station 14, i.e., may correspond to a synchronization in time, frequency, and/or space at the base station 14. Based on several mechanisms such as imprecise clocks of the transmitters $12_1$ and $12_2$, the frames $88_1$ and $88_2$ may have an offset in time when the signals $16_1$ and $16_2$ arrive at the base station 14. Further, based on different traveling times (Time Of Flight) of the signals $16_1$ and $16_2$, mechanisms like timing advance may be applied so as to synchronize frames $88_1$ and $88_2$ at the base station 14. I.e., the transmitters $12_1$ and $12_2$ may transmit at different times so as to compensate for the different time of flights.

The set-individual offset with regard to the synchronization in time, space and/or frequency at the base station 14 does not limit the signals to be transmitted to be directed to the base station each but also allow, alternatively or in addition a peer-to-peer communication, i.e., a transmission of signals directly between peers such as UEs or IoT devices. A peer-to-peer communication may benefit from the same advantages and may never the less agree on a common time/frequency/space structure as the one implemented at the base station 14.

Figure 5:
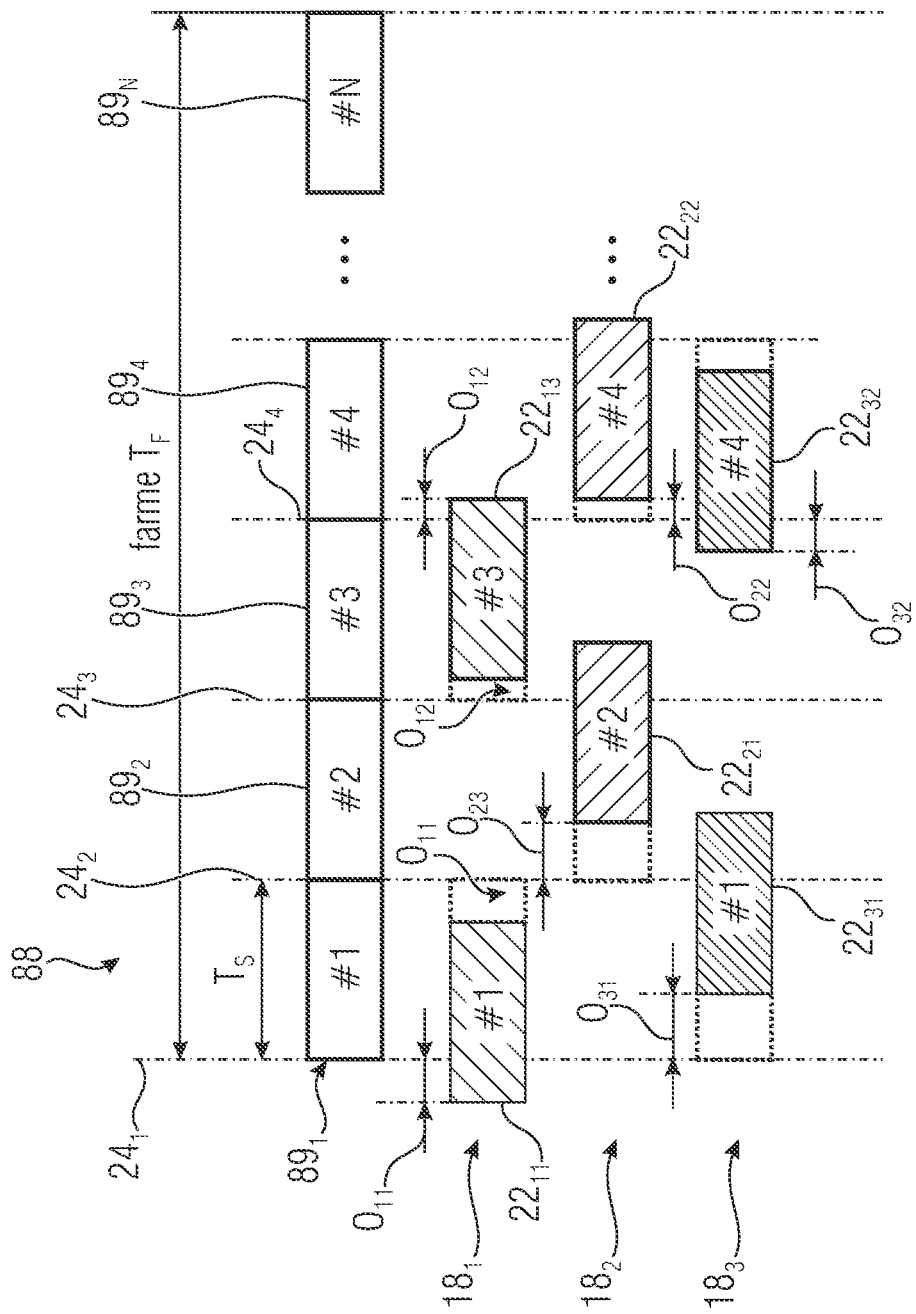
FIG. 5 shows a communication frame as having a number of N slots, each slot having a time duration $T_S$ within the frame duration $T_F$ and shows a set-individual offset in accordance with an embodiment.

In difference to those concepts or effects and in difference to a constant offset in time for a specific transmission, the transmitter $12_1$ and/or $12_2$ is configured to offset the transmission of each utilized slot within a frame individually, i.e., so as to comprise a set-individual offset as described in connection with FIG. 5. The set-individual offset refers to a set of physical resources used or employed within a slot. Resources of a frame or slot may exclusively be allocated to a single node. Alternatively, the base station may be configured for operating the wireless communications network cell according to a sparse allocation scheme. Alternatively or in addition, the transmitter may be configured for using the slots according to a sparse allocation scheme. A sparse allocation scheme may be understood as allocating only a subset of all possible resources to a node or application.

An example for a sparse allocation scheme is a non-orthogonal multiple access (NOMA) scheme. Such a NOMA scheme may be understood as allocating only a subset of slots to a transmitter or application and to reuse resources amongst transmitters or applications so as to generate an overload within the network. Collisions obtained thereby may be resolved such that an overall throughput may be increased. For example, FIG. 5 illustrates the frame 88 as having a number of N slots $89_1$ to $89_N$, each slot $89_1$ to $89_N$ having a time duration $T_S$ within the frame duration $T_F$. For example, a layer $18_1$ comprises resources of slots $89_1$ and $89_3$. A layer $18_2$ may comprise slots $89_2$ and $89_4$. A slot $18_3$ may comprise slots $89_1$ and $89_4$. By way of example, the four slots $89_1$ to $89_4$ are associated or divided into three sets or layers of slots, wherein each slot is double-used by a user $18_1$ to $18_3$. A different way of allocating or dividing resources may be implemented.

To each slot 89, there may be associated a set 22 of resources that may implement at least one resource element 94, a set or even complete resource block respectively. The set 22 of resources used by a transmitter may be set-individually offset with respect to a beginning or start $24_1$, $24_2$, $24_3$, $24_4$, respectively of a slot $89_i$. The transmitter may send the signal $16_1$ such that the resources $22_{11}$ are offset by the offset $O_{11}$ with respect to the beginning $24_1$ of slot $89_1$. Further, the transmitter may be configured for transmitting the signal $16_1$ such that the set $22_{13}$ of resources is offset by an offset $O_{12}$ with respect to the start $24_3$ of slot $89_3$ in time. Offsets $O_{11}$ and $O_{12}$ are different from each other and are individually selected or determined for each set $22_{11}$ and $22_{13}$ within a layer $18_1$ to $18_3$.

In layer $18_2$, set $22_{21}$ of resources is offset by an offset $O_{21}$ with respect to the start $24_2$ of slot $89_2$. Further, the set $22_{22}$ is offset by an offset $O_{22}$ with respect to the start $24_4$ of slot $89_4$.

Further, in layer $18_3$, a set $22_{31}$ (that may be equal to the set $22_{11}$) may be offset with a set-individual offset $O_{31}$ with respect to the start $24_1$. The set $22_{32}$ of layer $18_3$, that may be equal to the set $22_{22}$, may be offset by an offset $O_{32}$ with respect to the start $24_4$.

Within one layer $18_1$ to $18_3$ and/or within sets 22 of a same slot 89, the offsets may differ from each other, wherein the offsets are selected, chosen or set such that the respective offset applies at the receiving node, e.g., the base station. This allows colliding sets, e.g., sets $22_{11}$ and $22_{31}$, to be at least partially successfully decoded with a high probability.

A transmitter may use, select or have allocated any number of slots and/or any number of sets 22 and/or any number of resources allocated to a slot or OFDM symbol.

In other words, embodiments provide for a system where users access multiple instances of the channel resource for transmission. The motivation for the sparse resource mapping is to reduce the receiver complexity while effectively allowing for overloading the system. Embodiments provide for a system that extends known systems to consider (probably deterministic) sparse slot allocation, i.e., the transmission is spread over a subset of available slots within one frame (or subsets of physical resource blocks—PRBs— within an orthogonal grid). Additionally, embodiments allow to employ a user specific shift/offset in time and/or frequency domain, wherein user specific is related to user-specific patterns of set-individual offsets within one layer.

Embodiments are based on the assumptions that a sparse resource allocation can be assumed randomly, i.e., each user may pick a random slot/PRB(s) for transmission, as in a contention-based scenario. Alternatively, the allocation may be scheduled following a certain structure which can be regular (e.g., structured based on a predefined code-book or generated following a certain rule or may, alternatively, be irregular). Alternatively, or in addition, a UE/device or a set of UEs/devices with sporadic activation can use a preconfigured (rather than scheduled) set of resources such as a resource pool/bandwidth part or the like for non-orthogonal transmissions in a grant-free fashion. The preconfigured set of resources can be understood as a form of semi-persistent scheduling. A further assumption is that each slot may carry a replica of the user's code-word (e.g., in a random-access scheme) and/or may have parts of the message to be transmitted (i.e., the message is split and transmitted over multiple slots in case of a large code-word and/or a low code-rate).

Figure 6A:
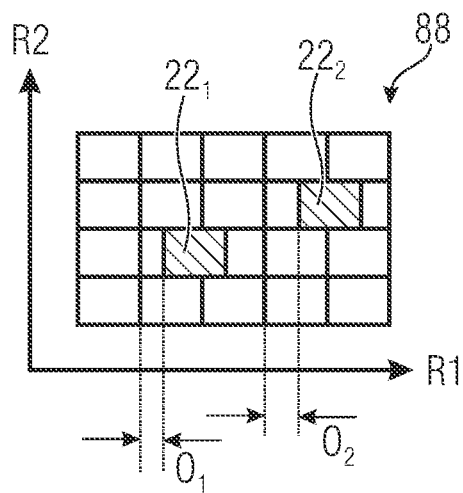
FIG. 6a shows a schematic diagram for illustrating an implementation of set-specific offsets according to an embodiment.

FIG. 6a shows a schematic diagram for illustrating an implementation of set-specific offsets according to an embodiment. By way of example, there is shown a two-dimensional grid of resources R1 and R2, wherein, for example, those resources are selected from the resource frequency, time, and space.

By way of example, resource R1 may be time and resource R2 may be frequency. Sets $22_1$ and $22_2$ of resources that are used by a receiver may be located differently in time and/or frequency, but may also have one resource with same, similar, or identical value. For example, as described in connection with FIG. 5, the sets $22_1$ and $22_2$ may have a same frequency at different times or different frequencies and the same times. Sets $22_1$ and $22_2$ are offset by set-individual offsets $O_1$ and $O_2$ in time.

Figure 6B:
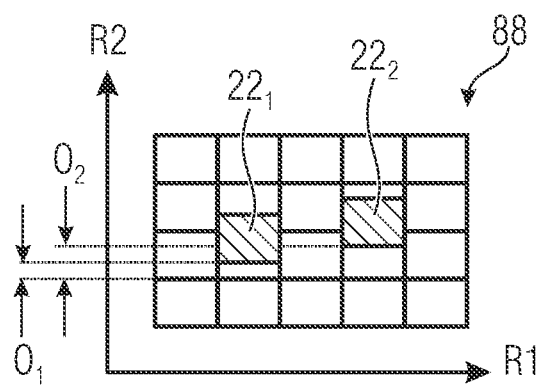
FIG. 6b shows a schematic diagram of sets $22_1$ and $22_2$ being offset by set-individual offsets in frequency according to an embodiment.

FIG. 6b shows a schematic diagram of sets $22_1$ and $22_2$ being offset by set-individual offsets $O_1$, $O_2$, respectively in frequency, i.e., resource R2.

Figure 6C:
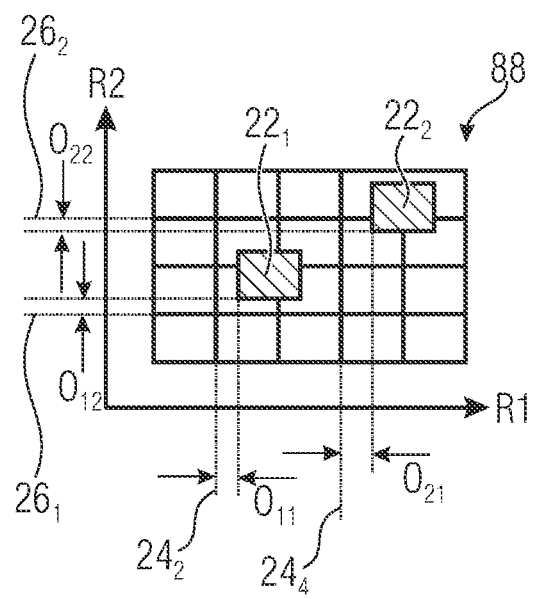
FIG. 6c shows a schematic diagram of the sets being offset as well as in a first resource time and a second resource frequency according to an embodiment.

FIG. 6c shows a schematic diagram of the sets $22_1$ and $22_2$ being offset as well as in resource R1 (time) and resource R2 (frequency). E.g., set $22_1$ is offset with an offset $O_{11}$ in time and with an offset $O_{12}$ in frequency with respect to a start $24_2$ in time and of a minimum frequency $26_1$ of the resources according to a synchronized schedule of the frame 88.

Set $22_2$ may be offset with an offset $O_{21}$ with respect to a start $24_4$ in time and/or with an offset $O_{22}$ with respect to a minimum frequency $26_2$ of the resources in the synchronized frame 88, wherein synchronization refers, within the scope of the present embodiments, to time and frequency.

Offsets described herein relate to non-zero values in time and/or frequency. According to an embodiment, it may be sufficient that one offset, i.e., the time-value or the frequency-value is non-zero. According to embodiments, both values may be non-zero. Further, embodiments relate to transmitters that offset different sets within a single frame with offsets of different resources. I.e., a first set of resources within a frame of a transmitter may be offset with respect to time and a second set may be offset with respect to frequency only. Alternatively, at least one of the sets may be offset in two-dimensions or even in three-dimensions, i.e., a third resource.

When referring again to FIG. 5, a maximum value of the set-individual offset in the illustrated two-dimensional grid, e.g., a time-frequency grid, may be selected such that a center of gravity of the used set of resources is located within the synchronized slot of the frame. I.e., a set-individual offset may comprise a time offset being larger than −0.5 of a time duration the slot and smaller than +0.5 of the time duration. Between those values, the set-individual offset may have any value, wherein, for example, the offsets may differ with respect to each other by at least 0.05 of the time duration of the slot, at least 0.1 of the time duration of the slot or 0.15 of the slot duration. Alternatively, although the described offset in time provides for the advantage that the transmitted part signal may uniquely associated with a slot, embodiments are not limited hereto such that an offset in time of less than −0.5 of the time duration and/or more than +0.5 of the time duration may be selected.

Alternatively or in addition, the set-individual offset may comprise a frequency offset. The frequency offset may be larger than −0.5 of a frequency bandwidth of a carrier or subcarrier used by the set and may be smaller than +0.5 of the frequency bandwidth. I.e., the set 22 being arranged within a carrier or subcarrier, the frequency offset may be smaller than half of the bandwidth in positive or in negative direction. Alternatively, although the described offset in frequency provides for the advantage that the transmitted part signal may uniquely associated, embodiments are not limited hereto such that an offset in frequency of less than −0.5 of the bandwidth and/or more than +0.5 of the bandwidth may be selected.

FIG. 6d shows a comparison between different offset schedules. Different layers $18_i$ may access or use different slots of frame 88, e.g. according to a sparse allocation scheme such as non-orthogonal multiple access (NOMA). Alternatively, a different scheme may be implemented and/or all slots may be accessed or used by one or more layers.

By way of example, the different schemes to be compared in FIG. 6d are illustrated over a common time axis t of time duration $t_{Frame}$ of frame 89, wherein the details explained may be transferred to any other resource being equipped with an offset such as frequency. The time axis may be valid for the base station, i.e., shows the arrival of signals at the base station.

The upper portion of FIG. 6d shows a synchronized or non-staggered or offset-free communication using the communication scheme or frame structure of FIG. 2b. Offset free refers, as the set-individual offset, to a synchronization at the base station, i.e., the signals of the transmitters arriving at the base station may be, for example, free of an offset, e.g., using a timing advance or the like.

The centered portion of FIG. 6d shows a known regular staggered communication in which each layer 18 has a constant, i.e., layer-specific offset such that a transmitter using layer $18_2$ uses offset $\Delta_1$ for all slots and a transmitter using layer $18_3$ uses a different offset $\Delta_1$ for all slots.

The lower portion of FIG. 6d shows a concept in accordance with embodiments. The concept may be referred to as irregular staggered which does not exclude that set-specific offsets for a regular or irregular pattern within a frame but refers to differing offset values within a layer 18. For example, in layer $18_1$ a set-specific offset $O_{11}$, is implemented for the first set $22_{11}$ of physical resources used in slot $89_1$ and set-specific offset $O_{12}$ is implement for the second set $22_{12}$ of physical resources used in slot $89_3$. Offsets $O_{11}$ and $O_{12}$ may differ from each other. Similarly, in layer $18_2$ a set-specific offset $O_{21}$, is implemented for the first used set $22_{21}$ of physical resources used in slot $89_2$ and set-specific offset $O_{22}$ is implement for the second used set $22_{22}$ of physical resources used in slot $89_L$. Similarly, in layer $18_3$ a set-specific offset $O_{31}$, is implemented for the first used set $22_{31}$ of physical resources used in slot $89_3$ and set-specific offset $O_{32}$ is implement for the second used set $22_{32}$ of physical resources used in slot $89_L$.

The set-individual offset $O_{12}$ may be comparatively large but is selected such that a center of gravity $38_{12}$ of the set $22_{12}$ is still within the associated or dedicated slot $89_3$. Accordingly, centers of gravity of the other sets may be inside the associated slots. The center of gravity of a slot such as center of gravity $38_{12}$ may be determined by a center of time or half of the time duration and/or by a center of frequency or half of the used frequency bandwidth.

Whilst offset values of different layers may be same or equal, even for a same slot used in different layers, set-specific offset values within a same layer $18_i$ may differ from each other with regard to at least one resource or dimension of the grid. That is, by way of example, when implementing a set-specific offset in two dimensions such as time and frequency, differing in time, set-specific offsets may be same or equal in frequency and/or vice versa.

Figure 7A:
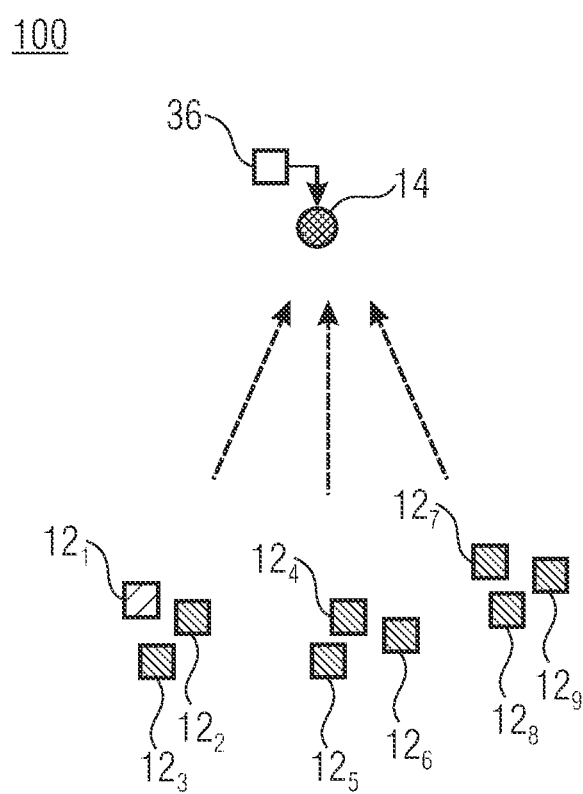
FIG. 7a shows a schematic block diagram of a wireless communications network cell in a configuration having the base station receiving signals from nine transmitting UEs according to an embodiment.

FIG. 7a shows a schematic block diagram of the wireless communications network cell 100 in a configuration having the base station 14 receiving signals from nine transmitting UEs $12_1$ to $12_9$.

Figure 7B:
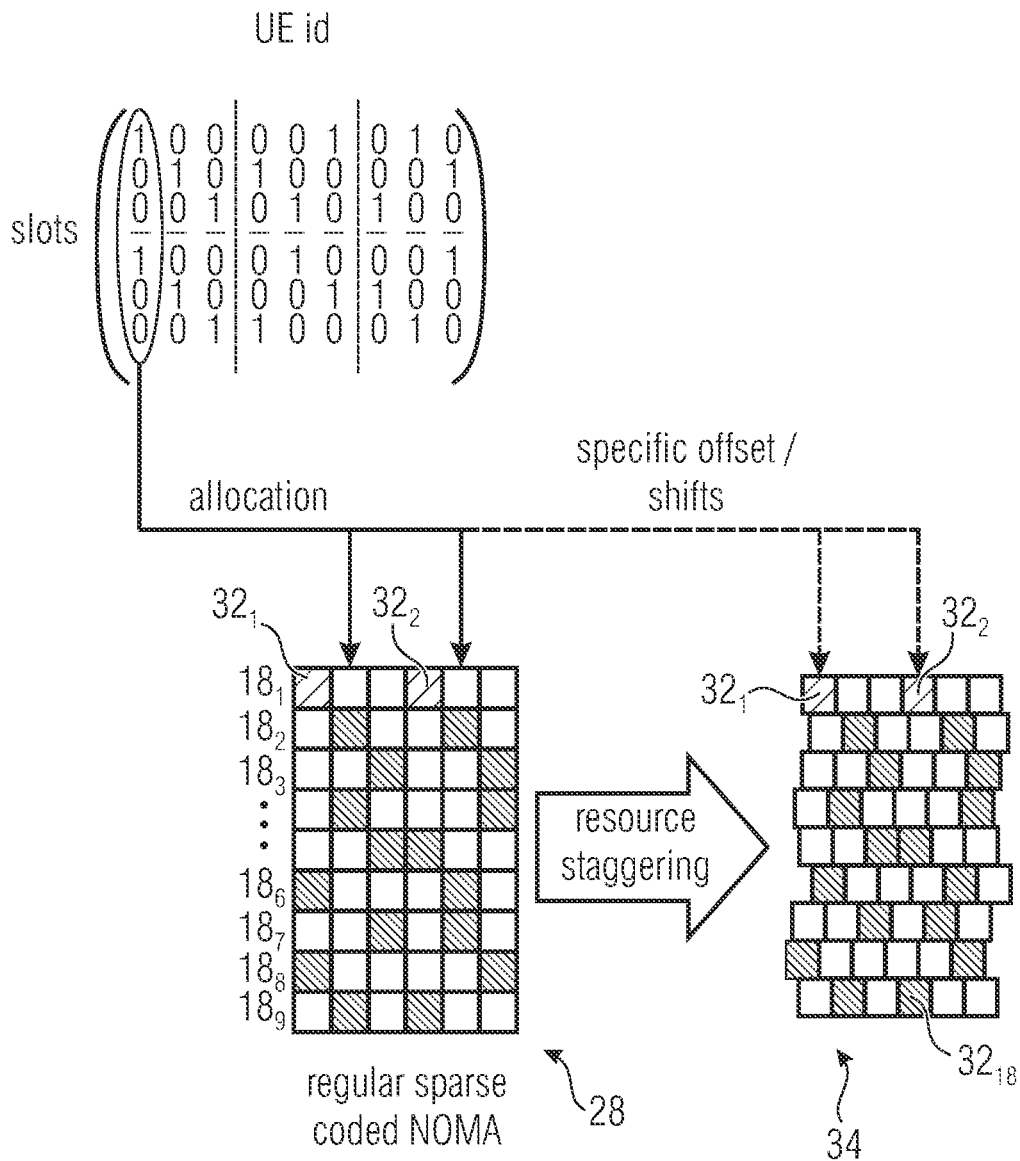
FIG. 7b shows a schematic diagram of an example scheme for scheduling six OFDMA symbols to the nine transmitters of FIG. 7a so as to overload the wireless channel and to enable the nine transmitters to transmit simultaneously according to an embodiment.

FIG. 7b shows a schematic diagram of an example scheme for scheduling the six OFDMA symbols to the nine UEs $12_1$ to $12_9$ of FIG. 7a so as to overload the wireless channel and to enable the nine transmitters to transmit simultaneously. Although this overload may lead to interference, based on a pattern according to which the different symbols are accessed, successful decoding may be possible. Alternatively or in addition to the number of symbols, the frame may be divided differently. An overloading allocation 28 this allocates only specific symbols or allocated sets 32 of resources to respective layers $18_1$ to $18_9$.

To each transmitter $12_1$ to $12_9$, a respective layer $18_1$ to $18_9$ may be associated. As described, more than one layer may be associated to a transmitter. The layers 18 associated to a single transmitter may be cyclically shifted so as to allow a single transmitter using resources that are spaced within the respective resources so as to increase an overall communication quality. For example, if a specific time slot or frequency range is blocked, probability may be low or reduced for a spaced apart time or frequency.

An overloading allocation 34 with offsets allows to obtain an offset to each allocated set $32_1$ to $32_{18}$ over all layers $18_1$ to $18_9$. The offset may be different between sets 32 within a layer $18_1$ to $18_9$.

In other words, one aspect of the embodiments described herein is that each user/layer has a random or deterministic offset, i.e., time delay or frequency shift or space shift in the range of at most ±half the respective maximum values such as a slot-duration or frequency bandwidth for each transmission, in particular, sparse transmissions. Each user/layer may transmit on more than one slot within one frame, for example, in a regular sparse scheme. Each of these transmissions may have a certain time shift and/or frequency shift on top. If shifts/delays are selected in the range of ±half the slot duration, the system may be denoted as "frame asynchronous", i.e., parts of the message may exceed the frame-boundaries, e.g., when the first slot has a negative time-offset and/or the last slot has a positive time-offset. If shifts are selected such that all transmissions area allocated within the frame, the system may be denoted as frame-synchronous. This may be obtained, for example, when leaving the first and/or last slot unused, e.g., in a sparse transmission, when providing for a positive offset for the first slot and/or a negative offset for the last slot. Although this was described in connection with time, the slots can also be frequency bins or any other resource.

When referring again to FIG. 7a, the delay to be applied may be determined by a network controller being in communication with the base station. Such a network controller may be at least partially implemented at a distant entity in communication with the base station and/or may at least partially be implemented as part of the base station. The network controller may at least partially be implemented in one or more transmitters.

The network controller 36 may be configured for determining an upper bound and/or a lower bound of the set-individual offset. Such information may be broadcasted, for example, by the network controller 36 and/or the base station 14. The transmitters $12_1$ and $12_9$ may select their respective offset to be applied within the boundaries communicated by the network controller 36 and/or the base station 14. That is, according to an embodiment, the transmitter selects its offset within the boundaries. Alternatively or in addition, the network controller may be configured for determining the set-individual offset. The network controller may thus provide for a direct value, a range from which the set-specific offset is to be selected and/or a codebook containing a plurality of offset-values, e.g., to determine a sequence of offset-values for a plurality of slots or frames such that by using such a sequence additional information or redundancy may be transmitted. The sequence may be determined or selected, for example, so as to obtain any kind of pseudo-random sequence being influenced, for example by a user-ID, a type of the device, a type of application operated by the transmitter or the like. Such a sequence may be preconfigured by way of a codebook.

The offset may be determined for a single transmitter, for all transmitters and/or group-wise for a group of transmitters. For example, transmitters that are collocated with respect to each other, for example, transmitters $12_1$ to $12_3$, transmitters $12_4$ to $12_6$ and transmitters $12_7$ to $12_9$, may be controlled so as to implement a same or at least comparable set-individual offset.

Such a group-based selection of the set-specific offset or a sequence thereof may be done based, for example, on a device category such that devices of a same category may have same offset-values or same boundaries, wherein different boundaries of different types of devices may be connected/overlapping or disjoint. Example types of devices are Internet-of-Things (IOT), voice, URLLC, eMBB (enhanced Mobile Broadband), etc., wherein this does not exclude a finer granularity, e.g., within IoT devices, for example, devices relating to water, gas, power etc. Alternatively or in addition, such a group based selection may also refer to an application being executed or implemented at the transmitter. This allows to facilitate autonomous networks excluding a centralized base station. Further, groups may also relate to types of services, e.g., voice services, IoT services, gold services or the like. For some or each of such services a specific offset or range thereof may be defined.

The base station 14 may transmit a signal to the transmitters $12_1$ to $12_9$, for example, as a signal having a dedicated receiver and/or by use of a broadcast signal. The signal may indicate the determined set-individual offset. The transmitter $12_1$ to $12_9$ may apply the set-individual offset according to the received signal. That is, alternatively or in addition to setting only the boundaries of the specific set-individual offset, the set-individual offset may be determined completely by the network controller 36. Alternatively or in addition, the transmitter $12_1$ to $12_9$ may select the set-individual offset randomly.

According to an embodiment, the base station 14 may operate the wireless communications network cell 100 according to a specific communication mode or in one of a predefined communication mode. A first mode may be, for example, to allocate all slots to a transmitter. a second mode may be, for example, to have a first overload rate such as 3:2. A third mode may be implemented so as to implement a second overload rate such as 9:6 as indicated in FIG. 7b or a different rate. The base station 14 may implement only one of those modes or may be configured to switch between modes, for example, responsive to a number of transmitters requesting communication within the cell 100. In either way, the transmitters may have knowledge about a specific number of sets 22 that may be used for communication within a frame. The transmitters 12 may further have knowledge about pre-defined patters of set-individual offsets, for example, by receiving a respective signal from the network controller 36 over the base station 14. Alternatively, such information may be common for the whole network and thus known to the transmitter. The transmitter $12_1$ to $12_9$ may select one of the patterns set-individual offset and may implement the set-individual offset according to the selected pattern.

By way of example, the network controller 36 may be configured for determining a plurality of sets of offsets. Each set of offsets may contain a plurality of offset-values associated to a plurality of sets 22 of physical resources. The transmitter may be configured for selecting one of the plurality of sets of offsets and to apply the set-individual offset to a plurality of sets 22 of physical resources within a frame.

According to an embodiment, each of the sets of offset-values may comprise a unique offset-pattern associated to the set of offset values. Such a uniqueness may also be known to the base station 14 and may thus enhance decoding or resolving interference as, for example, detected offsets for a subset of used sets 22 may lead to a pre-known or at least decodable set-individual offset for one or more remaining sets.

FIG. 8a shows a schematic block diagram illustrating the concept of mapping or dividing the signal 16 to be transmitted by a transmitter 12 into a number of part signals $42_1$ to $42_P$, wherein P may be any number larger than 1, for example, 2, 3, 4, 5, or even a larger number, e.g., 10, 15 or higher. The content of the signal 16 may be split so as to be included into one or more part signals $42_1$ to $42_P$. For example, the content of the signal 16 may be coded with a code rate such that information that needs to be transmitted is increased. When exceeding a number of OFDM symbols within a slot, a higher number of slots may be used so as to commonly transmit the signal 16. Alternatively or in addition, one or more of the part signals $42_1$ to $42_P$ may contain a retransmission of a different part signal. I.e., the content of any part signal $42_1$ to $42_P$ may be same and/or different when compared to each of the remaining part signals. Each of the part signals $42_1$ to $42_P$ may be mapped to a respective set $22_1$ to $22_P$ of frame 88. That is, the transmitter may be configured for dividing the signal 16 into a number of part signal and/or to retransmit at least a part of the signal as a part signal.

The number of part signals 42 may be known at the beginning of mapping the signal 16 into part signals, e.g., based on the number of fractions used or that may be used. Alternatively, the number may dynamically be chosen, e.g., when awaiting a positive or negative acknowledgement (ACK/NACK) that may cause the transmitter to transmit a further retransmission as part of the signal, thereby spontaneous or dynamically increasing the number of part signals. That is, the number of re-transmissions can be fixed or adaptive, e.g. each UE re-transmits until an ACK is received or a maximum number of re-transmissions is performed. Embodiments relate to the set-individual offset being implemented as a pattern. For example, each part of the message (part signal) is derived from the number of repetitions may indicate its number of retransmissions by the offset chosen. (e.g. the first transmission has 0 offset, the second has 1, the third has 2 . . . etc.). This has the advantage that a receiver can estimate the number of re-transmissions that may be used for successful decoding.

I.e., a part signal may be at least a first re-transmission of another part signal, wherein the set-individual offset is selected such that the set-individual offset applied to the re-transmitting part-signal is associated with a number of prior transmissions.

Figure 8B:
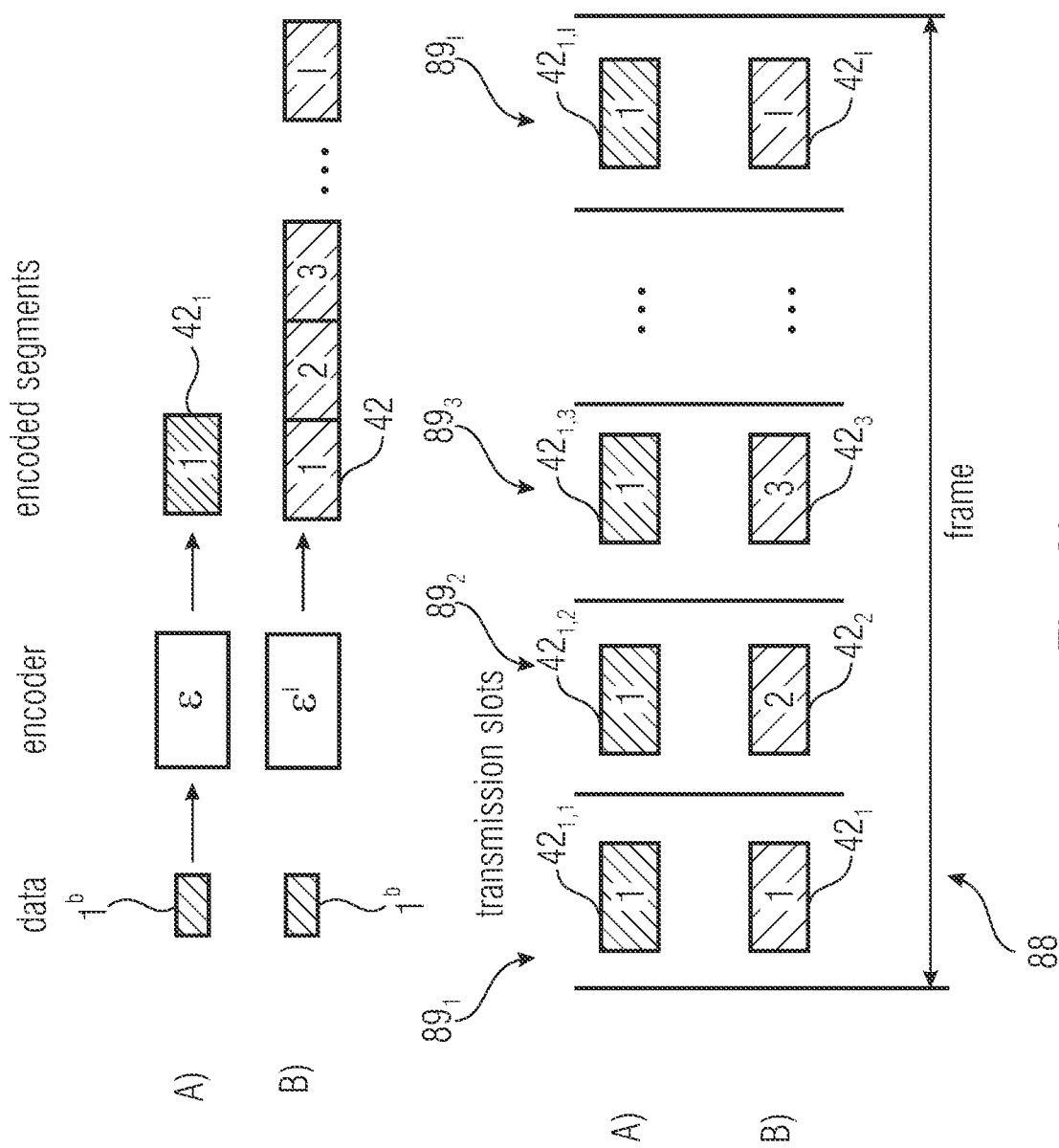
FIG. 8b shows a schematic block diagram illustrating different options of mapping a signal to be transmitted by a transmitter into a number of part signals according to embodiments.
Figure 9:
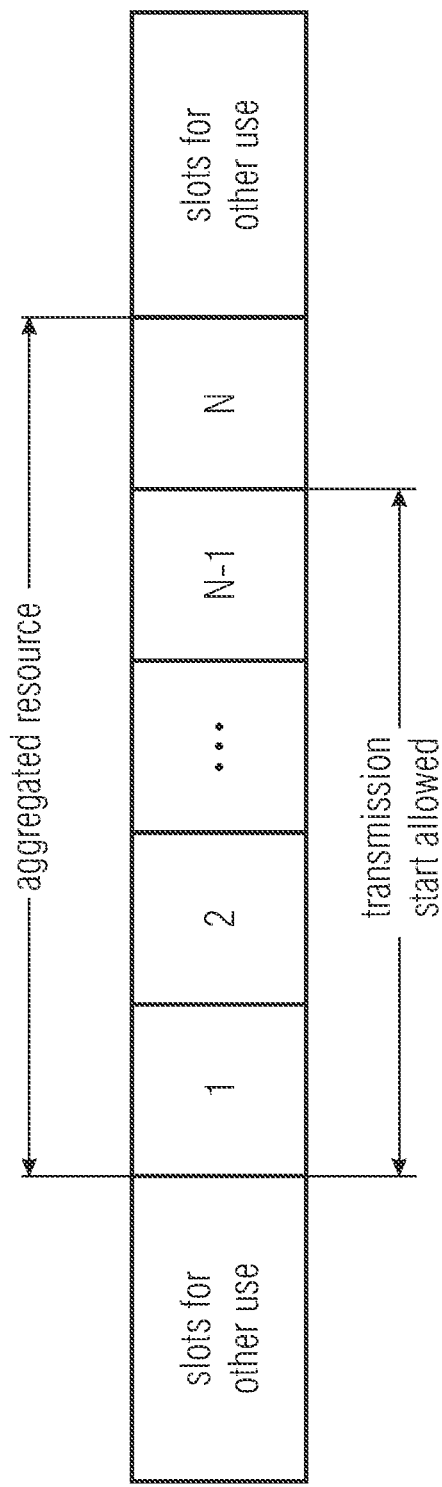
FIG. 9 shows a schematic diagram of a communications scheme using aggregated resources.

FIG. 8*b* shows a further schematic block diagram illustrating the concept of mapping the signal 16 to be transmitted by a transmitter 12 into a number of part signals 42. According to an option A) the signal 16 may be transmitted in one single slot $89_i$ of frame 88, i.e., the signal 16 may be incorporated into a single part signal $42_1$. This part signal $42_1$ may be repeatedly transmitted in the associated slots which are, for example, all slots 89 of frame 88. That is, the part signal $42_1$ is transmitted as part signal $42_{1,1}$ in the first allocated or selected slot $89_1$, as part signal $42_{1,2}$ in the second slot $89_2$, as part signal $42_{1,3}$ in the third slot $89_3$ and so on. The part signals $42_{1,i}$ with i=1, . . . , I may thus contain equal information or be equal.

According to an option B), the signal 16 is divided into a number of I part signals $42_i$ with i=1, . . . , I and be each a fraction of signal 16 and thus comprise different information. Each of the part signals $42_i$ may be transmitted in a corresponding slot $89_i$.

Option A) and B) are extreme cases in either having no retransmission and only fractions in option B) or only retransmissions and no fractions in option A). Embodiments are not limited hereto but allow for mixing both options up, i.e., to have fractions as well as repetitions/retransmissions. Further embodiments are not limited to transmissions in which each slot is assigned to a user but can also be implemented in sparse allocation schemes.

Embodiments allow thus to an improved diversity that can be exploded at the receiver for decoding. Embodiments may be used for an extension to NOMA with sparse resource allocation in order to increase the time-diversity and to resolve collisions, but are not limited hereto and may also be implemented in connection with regular resource allocations. Embodiments may alternatively or in addition be used as an extension, i.e., on top, to time-hoping concepts. Such a design is proposed for ultra-reliable low latency communication (URLLC), see [2]. In connection with the embodiments described herein, a low latency may be obtained together with a high probability of decoding messages at the receiver such that both targets may be achieved, i.e., having a high throughput and having a high reliability. An example for a known URLLC given in [2], where K repetitions are scheduled persistently to the UE in order to increase the reliability states that: "even more than one UE is assigned the same periodicity, offset and symbol allocation with the slot, and if these UEs become active at the same time, then they will collide persistently. Frequency hopping can address this situation to some extent provided there are sufficiently many RBs available to hop across relative to the RB allocation needed for each UE. However, especially if reliability is an important consideration (such as for eURLLC), the number of RBs that may be used for each transmission may itself be large. In such a scenario, an alternative option is to have hopping in the time domain. The same design is applicable to both PUSCH repetition with and without grant."

Embodiments are related to a sign and additional user dependent fractional offset to the repetitions (on resource element (RE)-level in time/frequency domain) in order to provide persistent collision.

A transmitter according to an embodiment, for example, the transmitter $12_1$ and/or $12_2$ of FIG. 4 and/or one or more of the transmitters $12_1$ to $12_9$ of FIG. 7*a* may comprise an interface configured for transmitting a signal in a wireless communications network cell of a wireless communications network. The transmitter may comprise a control unit configured for mapping the signal into a number of part signals, as described, for example, in connection with FIG. 8*a*. The control unit may be configured for transmitting the number of part signals with a corresponding number of associated slots or sets 22 of the wireless communications network cell using a corresponding number of sets of physical resources. Each set may contain at least a subset of the associated plurality of physical resources of the slot. The control unit may be configured for transmitting the number of part signals with a set-individual offset such that each set of physical resources is shifted with respect to a synchronized start of the slot in time and/or frequency. That is, the part signals may be transmitted in a set 22 each, wherein each set may have a subset or all of the available resources of a slot.

A base station according to an embodiment, for example, the base station 14, may be configured for operating a wireless communications network cell, e.g., cell 100, according to a wireless communications network scheme. The scheme may comprise a plurality of frames, each frame comprising a plurality of slots, each slot comprising a plurality of associated physical resources. The base station may comprise an interface configured for receiving a first number of part signals from a first transmitter. The interface may be configured for receiving a second number of part signals from a second transmitter. Each part signal is associated to a slot of a dedicated frame, i.e., the first number of part signals and the second number of part signals are received within the same frame and are scheduled, by the respective transmitter, to the same frame. Each part signal of the first number of part signals comprises a set-individual offset within the first number and with respect to a synchronized start of the slot. Each part signal of the second number of part signals comprises a set-individual offset within the second number and with respect to the synchronized start of the slot. According to embodiments, the set-individual offsets of the first number and of the second number may be same, for example, based on a group-wise definition of a network controller and/or by selecting the same values by the respective transmitter. Alternatively, the offsets may be different when compared to each other. In both cases, the set-individual offsets may comprise different offset values within the first number and within the second number of parked signals. the base station may comprise a decoding unit configured for decoding the received first part signals and the received second part signals and for correcting interference caused by an overlap of the first part signals with the second part signals.

In the following, additional embodiments and aspects of the invention will be described which can be used individually or in combination with any of the features and functionalities described herein.

1. Wireless communications network comprising:
    a base station configured for operating a wireless communications network cell of the wireless communications network so as to provide communication in a plurality of slots 89, each slot 89 comprising a plurality of associated physical resources;
    at least one transmitter 12 configured for transmitting a signal 16 in the wireless communications network cell 100 by mapping the signal 16 into a number of part signals 42 and for transmitting the number of part signals 42 with a corresponding number of associated slots 89 using a corresponding number of sets 22 of physical resources, each set 22 containing at least a subset of the associated plurality of physical resources of the slot 89;
    wherein each set 22 of physical resources is received at the base station 14 shifted with a set-individual offset O with respect to a synchronized start 24, 26 of the slot 89.
2. The wireless communications network of aspect 1, wherein the set-individual offset O comprises an offset in time and/or in frequency.
3. The wireless communications network of aspect 1 or 2, wherein the set-individual offset O is set such that in a two-dimensional time-frequency grid a center of gravity of the set 22 of resources is within the associated slot 89.
4. The wireless communications network of one of previous aspects, wherein the set-individual offset O comprises a time offset and wherein the time offset is larger than −0.5 of a time duration of the slot 89 and smaller than +0.5 of the time duration.
5. The wireless communications network of one of previous aspects, wherein the set-individual offset O comprises a frequency offset and wherein the frequency offset is larger than −0.5 of a frequency bandwidth of a carrier and smaller than +0.5 of the frequency bandwidth.
6. The wireless communications network of one of previous aspects, wherein the set-individual offset O is a non-zero offset selected individually for each set 22 within a frame 88 comprising a number of slots 89.
7. The wireless communications network of one of previous aspects,
    wherein a network controller 36 being in communication with the base station 14 is configured for determining an upper bound and a lower bound of the set-individual offset O and wherein the transmitter 12 is configured for determining the set-individual offset O so as to be within the lower bound and the upper bound; and/or
    wherein the network controller 36 is configured for determining the set-individual offset, wherein the base station 14 is configured for transmitting a signal to the transmitter 12, indicating the determined set-individual offset O, wherein the transmitter 12 is configured for applying the set-individual offset according to the signal; and/or
    wherein the transmitter 12 is configured for selecting the set-individual offset O randomly.
8. The wireless communications network of one of previous aspects, wherein a network controller 36 being in communication with the base station 14 is configured for determining a plurality of sets of offsets, each set of offsets containing a plurality of offset-values associated to a plurality of sets 22 of physical resources, wherein the transmitter 12 is configured for selecting one of the plurality of sets of offsets and to apply the set-individual offsets O to a plurality of sets 22 of physical resources within a frame 889 comprising a number of slots 89.
9. The wireless communications network of aspect 8, wherein the each of the sets of offset-values comprises a unique offset-pattern associated to the set of offset-values.
10. The wireless communications network of one of previous aspects, wherein the second part signal $42_2$ is at least a first re-transmission of the first part signal $42_1$, wherein the set-individual offset is selected such that the set-individual offset applied to the second part-signal $42_2$ is associated with a number of prior transmissions.
11. The wireless communications network of one of previous aspects, wherein a network controller 36 being in communication with the base station 14 is configured for determining the set-individual offset of a first slot $89_a$ or last slot $89_N$ of a frame so as to exceed the frame 88.
12. The wireless communications network of one of previous aspects, wherein the base station 14 is configured for operating the wireless communications network cell 100 according to a sparse allocation scheme and/or wherein the transmitter 12 is configured for using the slots 89 according to the sparse allocation scheme.
13. The wireless communications network of one of previous aspects, wherein the base station 14 is configured for operating the wireless communications network cell 100 according to a non-orthogonal multiple access scheme and/or wherein the transmitter 12 is configured for using the slots according to the non-orthogonal multiple access scheme.
14. The wireless communications network of aspect 13, wherein the base station 14 is configured for operating the wireless communications network according to a frame structure, each frame 88 comprising a number of slots 89, wherein the non-orthogonal multiple access scheme provides for a plurality of layers 18, each layer 18 comprising a subset of the number of slots 89, wherein the transmitter 12 is configured for using at least one layer 18 for transmission.
15. The wireless communications network of aspect 14, wherein the transmitter 12 is configured for using at least a first and a second layer 18 within a frame 88.
16. The wireless communications network of aspect 15, wherein the first layer 18 and the second layer 18 are cyclically shifted within the plurality of layers.

17. The wireless communications network of one of previous aspects, wherein the transmitter 12 is configured for dividing the signal 16 into the number of part signals 42 and/or to retransmit at least a part of the signal 16 as a part signal 16.

18. The wireless communications network of aspect 17, wherein the transmitter is configured for dynamically mapping the signal into a dynamically changing number of part signals.

19. The wireless communications network of one of previous aspects, wherein the set-specific offset is defined for a group of transmitters, the group being formed based on at least one of:
   an application of the transmitter;
   a device type of the transmitter; and
   a service provided by the transmitter.

20. Wireless Communications network comprising:
   a base station 14 configured for operating a wireless communications network cell 100 of the wireless communications network so as to provide communication in a plurality of slots 88, each slot 88 comprising a plurality of associated physical resources;
   at least one transmitter 12 configured for transmitting a signal 16 in the wireless communications network cell 100 by mapping the signal 16 into a number of part signals 42 and for transmitting the number of part signals 42 associated to a corresponding number of slots using a corresponding number of sets 22 of physical resources, each set 22 containing at least a subset of the associated plurality of physical resources of the slot;
   wherein each set 22 of physical resources is received at the base station shifted with a frequency offset $O_1$, $O_2$, $O_{12}$, $O_{22}$ with respect to a synchronized minimum frequency $26_1$, $26_2$ of the slot 88.

21. The wireless communications network of aspect 20, wherein the frequency offset $O_1$, $O_2$, $O_{12}$, $O_{22}$ is a set-individual offset O.

22. A transmitter 12 comprising:
   an interface configured for transmitting a signal 16 in a wireless communications network cell 100 of a wireless communications network;
   a control unit configured for mapping the signal 16 into a number of part signals 42 and for transmitting the number of part signals 42 with a corresponding number of associated slots 89 of the wireless communications network cell 100 using a corresponding number of sets 22 of physical resources, each set 22 containing at least a subset of the associated plurality of physical resources of the slot 89;
   wherein the control unit is configured for transmitting the number of part signals 42 with a set-individual offset O such that each set 22 of physical resources is shifted with respect to a synchronized start of the slot.

23. A base station 14 configured for operating a wireless communications network cell 100 according to a wireless communications network scheme comprising a plurality of frames 88, each frame 88 comprising a plurality of slots 89, each slot 89 comprising a plurality of associated physical resources, the base station 14 comprising:
   an interface configured for receiving a first number of part signals 42 from a first transmitter 12₁; and a second number of part signals 42 from a second transmitter 12₂, each part signal 42 being associated to a slot 89 of a dedicated frame 88, wherein each part signal 89 of the first number of part signals comprises a set-individual offset O within the first number and with respect to a synchronized start 24 of the slot 8; and wherein each part signal 42 of the second number part signals comprises a set-individual offset O within the second number and with respect to the synchronized start 24 of the slot 88;
   a decoding unit configured for decoding the received first part signals 42 and the received second part signals 42 and for correcting interference caused by an overlap of the first part signals 42 with the second part signals 42.

24. Method for operating a wireless communications network, the method comprising:
   operating a wireless communications network cell 100 of the wireless communications network so as to provide communication in a plurality of slots 89 such that each slot 89 comprises a plurality of associated physical resources;
   transmitting a signal 16 in the wireless communications network cell by mapping the signal 16 into a number of part signals 42;
   transmitting the number of part signals 42 with a corresponding number of associated slots 89 using a corresponding number of sets 22 of physical resources, each set 22 containing at least a subset of the associated plurality of physical resources of the slot 89;
   such that each set 22 of physical resources is received at a base station 14 shifted with a set-individual offset O with respect to a synchronized start 24, 26 of the slot 89.

25. Method for operating a wireless communications network, the method comprising:
   operating a wireless communications network cell 100 of the wireless communications network so as to provide communication in a plurality of slots 88 such that each slot 88 comprises a plurality of associated physical resources;
   transmitting a signal 16) in the wireless communications network cell by mapping the signal 16) into a number of part signals 42);
   transmitting the number of part signals 42 with a corresponding number of associated slots 89 using a corresponding number of sets 22 of physical resources, each set 22 containing at least a subset of the associated plurality of physical resources of the slot 89;
   such that each set 22 of physical resources is received at a base station 14 shifted with a frequency offset $O_1$, $O_2$, $O_{12}$, $O_{22}$ with respect to a synchronized minimum frequency 26 of the slot 88.

26. Method for operating a transmitter 12, the method comprising:
   transmitting a signal 16 in a wireless communications network cell 100 of a wireless communications network using an interface by mapping the signal 16 into a number of part signals 42; and by transmitting the number of part signals 42 with a corresponding number of associated slots 89 of the wireless communications network cell 100 using a corresponding number of sets 22 of physical resources, each set 22 containing at least a subset of the associated plurality of physical resources of the slot 89;
   transmitting the number of part signals 42 with a set-individual offset O such that each set 22 of physical resources is shifted with respect to a synchronized start 24, 26 of the slot.

27. Method for operating a base station 14 configured for operating a wireless communications network cell 100 according to a wireless communications network scheme comprising a plurality of frames 88, each frame 88 comprising a plurality of slots 89, each slot 89 comprising a plurality of associated physical resources, the method comprising:

receiving a first number of part signals 42 from a first transmitter $12_1$; and receiving a second number of part signals 42 from a second transmitter $12_2$, each part signal 42 being associated to a slot 89 of a dedicated frame 88, wherein each part signal 42 of the first number of part signals comprises a set-individual offset O within the first number and with respect to a synchronized start 24, 26 of the slot; and wherein each part signal 42 of the second number part signals comprises a set-individual offset O within the second number and with respect to the synchronized start 24, 26 of the slot; and decoding the received first part signals 42 and the received second part signals 42 and for correcting interference caused by an overlap of the first part signals 42 with the second part signals 42.

28. Non transitory storage medium having stored thereon a computer program having a program code for performing, when running on a computer, a method according to one of aspects 24 to 27.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP: R1-1810623, Transmitter side signal processing of ACMA, Hughes
[2] 3GPP: R1-1811274, "Enhanced SPS and grant-free transmissions"

The invention claimed is:

1. A transmitter comprising:
an interface configured for transmitting a signal in a wireless communications network cell of a wireless communications network;
a control unit configured for mapping the signal into a number of part signals and for transmitting the number of part signals with a corresponding number of associated slots of the wireless communications network cell using a corresponding number of sets of physical resources, each set comprising at least a subset of the associated plurality of physical resources of the slot;
wherein the control unit is configured for transmitting the number of part signals with a set-individual offset being individual for the set of physical resources such that each set of physical resources is shifted with respect to a synchronized start of the slot.

2. The transmitter according to claim 1, wherein the transmitted signal is one of:
a first transmission,
a first retransmission or replica of the first transmission,
a second retransmission of the first transmission
a k-th retransmission of the first transmission
a second transmission comprising partial information of a first transmission
a second transmission comprising partial information of a first retransmission.

3. The transmitter according to claim 1, wherein the set-individual offset is at least one of:
   a configured offset;
   a selected offset; and
   a fixed offset.

4. The transmitter according to claim 3, wherein the transmitter is configured for selecting the selected offset based on at least one of:
   a number of retransmissions;
   from a list of configured offsets;
   according to a selected or configured criterion such as a device category;
   based on an application executed or implemented at the transmitter;
   a device type of the transmitter;
   a service provided by the transmitter
   according to a configured or selected (hopping) sequence; and
   randomly.

5. The transmitter according to claim 1, wherein the synchronized start of the slot refers to:
   a start of a frame comprising the slot;
   a feature of a frame comprising a sequence of slots; and
   a start of a symbol such as an OFDM symbol wherein a sequence of symbols forms the slot.

6. The transmitter according to claim 1, wherein the transmitter is configured for deriving a part signal from a number of repetitions of the transmission and to select the set-individual offset based on the number of retransmissions, wherein the set-individual offset indicates a number of retransmissions.

7. The transmitter according to claim 1, wherein the transmitter is adapted to acquire at least one of the part signals to comprise a retransmission of a different part signal.

8. The transmitter according to claim 1, wherein the transmitter is configured for dividing the signal into a number of part signal and/or to retransmit at least a part of the signal as a part signal.

9. The transmitter according to claim 1, wherein the transmitter is configured for dynamically mapping the signal into a dynamically changing number of part signals.

10. The transmitter according to claim 1,
    wherein the transmitter is configured for determining the set-individual offset so as to be within a lower bound and an upper bound indicated by a network controller or a base station; and/or
    wherein the transmitter is configured for applying the set-individual offset according to a received signal indicating the set-individual offset; and/or
    wherein the transmitter is configured for selecting the set-individual offset randomly.

11. The transmitter according to claim 1, wherein the transmitter is configured for receiving a signal indicating a plurality of sets of offsets and for selecting one of the plurality of sets of offsets and to apply the set-individual offsets to a plurality of sets of physical resources within a frame comprising a number of slots.

12. The transmitter of claim 11, wherein the each of the sets of offset-values comprises a unique offset-pattern associated to the set of offset-values.

13. The transmitter according to claim 1, wherein the transmitter is configured for using the slots according to a sparse allocation scheme.

14. The transmitter according to claim 1, wherein the transmitter is configured for using the slots according a non-orthogonal multiple access scheme.

15. A base station configured for operating a wireless communications network cell of the wireless communications network so as to provide communication in a plurality of slots, each slot comprising a plurality of associated physical resources;
    wherein the base station is configured for receiving, from a plurality of transmitters a corresponding plurality of signals, each signal being mapped into a number of part signals and transmitted with the number of part signals with a corresponding number of associated slots using a corresponding number of sets of physical resources, each set comprising at least a subset of the associated plurality of physical resources of the slot, and shifted with a set-individual offset being individual for the set of physical resources with respect to a synchronized start of the slot; and wherein the base station is configured for processing the received signals.

16. The base station of claim 15,
    wherein a network controller being in communication with the base station is configured for determining an upper bound and a lower bound of the set-individual offset; wherein the base station is configured for transmitting a signal to the transmitter, indicating the determined set-individual offset.

* * * * *